(12) United States Patent
Sekiguchi et al.

(10) Patent No.: US 7,245,659 B2
(45) Date of Patent: Jul. 17, 2007

(54) IMAGE ENCODING METHOD AND APPARATUS, IMAGE DECODING METHOD AND APPARATUS, AND IMAGE PROCESSING SYSTEM

(75) Inventors: Shunichi Sekiguchi, Yamato (JP); Minoru Etoh, Yokohama (JP); Mitsuru Kobayashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 862 days.

(21) Appl. No.: 10/297,488

(22) PCT Filed: Apr. 8, 2002

(86) PCT No.: PCT/JP02/03498

§ 371 (c)(1),
(2), (4) Date: Dec. 9, 2002

(87) PCT Pub. No.: WO02/085029

PCT Pub. Date: Oct. 24, 2002

(65) Prior Publication Data

US 2003/0179825 A1    Sep. 25, 2003

(30) Foreign Application Priority Data

Apr. 9, 2001   (JP) .............................. 2001-110663

(51) Int. Cl.
 *H04N 7/12*   (2006.01)
(52) U.S. Cl. ................................. 375/240.12
(58) Field of Classification Search ...............
   375/240.12–240.16, 240.18–240.2, 240.24;
   382/232, 250; *H04N 7/12*
 See application file for complete search history.

(56) References Cited

U.S. PATENT DOCUMENTS 6,289,131 B1 * 9/2001 Ishikawa ..................... 382/232

(Continued)

FOREIGN PATENT DOCUMENTS

EP        0 926 896 A2    6/1999

(Continued)

OTHER PUBLICATIONS

Ralph Neff et al.: "Very low bit-rate video coding based on matching pursuits" IEEE Transactions on Circuits and Systems for Video Technology, vol. 7, No. 1, pp. 158-171 Feb. 1997.

*Primary Examiner*—Young Lee
(74) *Attorney, Agent, or Firm*—Oblon, Spivak, McClelland, Maier & Neustadt, P.C.

(57) ABSTRACT

A method and an apparatus improving the coding efficiency by representing encoded data in a compact form by means of a pattern matching technique. A waveform vector similar to a partial signal waveform of an image signal in a predetermined group of waveform vectors is searched for. When a compression encoding is performed for information to identify the waveform vector searched for, similarity information, and a position in an image signal of the partial signal waveform in accordance with a predetermined encoding rule, the position in the image signal of the partial signal waveform is encoded through replacement with position information in a predetermined partial domain of the image signal. As a result, since the position in the image of the partial signal waveform that is the most similar to the waveform vector is encoded through replacement with the position information in the predetermined partial domain of the image signal, it is possible to represent the position more compactly.

39 Claims, 14 Drawing Sheets

U.S. PATENT DOCUMENTS

2003/0103679 A1* 6/2003 Etoh et al. .................. 382/250

FOREIGN PATENT DOCUMENTS

| JP | 11-41596 | 2/1999 |
| JP | 11-191153 | 7/1999 |
| JP | 2001-298738 | 10/2001 |

* cited by examiner

IMAGE ENCODING METHOD AND APPARATUS, IMAGE DECODING METHOD AND APPARATUS, AND IMAGE PROCESSING SYSTEM

TECHNICAL FIELD

The present invention relates to an image encoding and decoding method for encoding a source image such as a moving image and a still image and decoding the encoded image and, more particularly, to an image encoding method, an image encoder, an image decoding method and an image decoder that can encode an image and decode the encoded image with no use of DCT (discrete cosine transform) employed in standard algorithms of MPEG series and so on.

Furthermore, the present invention relates to an image processing system that encodes and decodes an image in accordance with such an image encoding method and an image decoding method.

BACKGROUND ART

In a conventional standard moving image encoding method such as ITU-T H.26x and MPEG series, DCT (discrete cosine transform) is used as a means to decrease spatial redundancy. Generally, when an image signal is represented in a spatial frequency domain, electric power has a tendency to concentrate at a low frequency level. The DCT performs an orthogonal transform for a block formed of 8×8 pixels in an image signal space, decomposes an image signal of a source image into a predetermined combination of bases, and obtains coefficients of the bases. The DCT has a characteristic of increasing the coefficient values, that is, a degree of bias with respect to a frequency component. Since the DCT especially concentrates the bias on a low frequency level that plays an important role in vision, the DCT can enhance compression efficiency by performing an adaptive bit distribution.

On the other hand, when encoding is performed at an extremely low bit rate, a resulting coarse quantization degrades a reconstruction of the coefficients. Consequently, there arise some problems in that it is impossible to reconstruct important bases to an intrinsic signal representation. Also, since the DCT operates a closed process on an 8×8 image block, the DCT has the tendency that a distortion caused by quantization noticeably appears in a boundary of blocks. That generates a block distortion and exhibits in the image an element that the original signal does not contain visually, whereby the element is recognized as a seriously noticeable noise.

A large number of bases are required to faithfully reconstruct a steep luminance fluctuation such as a step edge and a portion of waveform having a random pattern. In general, when a weight with respect to vision is considered, a code assignment for a coefficient corresponding to a high frequency level is weighted less than a low frequency level. As a result, the coefficient in the high frequency, which plays an important role in reconstructing the waveform, is lost. The loss of the coefficient causes harmful noise peculiar to the DCT and results in image quality degradation.

In order to overcome such a problem that the DCT entails in a high compression, a method such that a code representation thereof is free from a block structure is proposed. For example, the paper "Very Low Bit-rate Video Coding Based on Matching Pursuits" (R. Neff et.al, IEEE Trans. on CSVT, vol.7, pp.158–171, February 1997) discloses that a technique "Matching Pursuits" (pattern matching) is used to expand an inter frame prediction error signal in a linear combination of an over-complete basis set. In such a technique, since the larger number of bases (basic signal patterns) is available than the DCT and a unit of basis representation is not limited to a block, it is possible to obtain superior image quality with respect to vision at a low rate of encoding compared to the DCT encoding.

In order to take advantage of the "Matching Pursuits" encoding technique, however, the problem that there is a burden on implementation such as the number of operations necessary for the encoding side to perform the basis search is pointed out. Also, it is necessary to efficiently represent position information because the searched basis may be located at an arbitrary pixel position on an image plane.

On the other hand, there is an approach that an encoding distortion is eliminated by using hierarchical encoding. SNR Scalability mode (ISO/IEC 13818-2) in MGEG-2 and MPEG-4 Fine Granularity Scalability (FGS) mode (ISO/IEC JTC1/SC29/WG11/N3908) follow this approach. Hereinafter, the hierarchical encoding aiming at compensating such an encoding distortion factor is called "quality hierarchical encoding". The quality hierarchical encoding technique is a technique such that an encoding distortion generated in an encoding picture in a base layer is separately encoded as an enhance layer and a decoding side sums signals obtained by decoding individual layers so as to enhance the quality of a decoded image. Regarding the quality hierarchical encoding technique, the necessary number of transmission bits increases by an amount of encoding data in the enhance layer. However, since it is possible to transmit the semantic content of a picture only in the base layer, the quality hierarchical encoding technique is favorable for a picture transmission required to accommodate flexibly to a network such as the Internet and a wireless network whose transmission condition (bit rate, packet loss probability, error rate and so on) varies over time.

In the MPEG-4 FGS, since the DCT is further performed for an encoding error signal in the enhance layer and the resulting coefficients are transmitted per bit plane, it is possible to transmit a picture in a manner such that the picture quality is gradually improving in the decoding side as its name suggests. However, the enhance layer still depends on the DCT and the DCT block structure, and a distortion component depending upon the block structure, which shows up in an encoding distortion component in the base layer, generates high order DCT coefficients. As a result, if little information is used in the enhance layer, the encoding does not work efficiently.

DISCLOSURE OF INVENTION

It is a first object of the present invention to provide a method and an apparatus that improve total coding efficiency by compactly representing encoded data by means of the pattern matching technique.

It is a second object of the present invention to provide an image processing system that encodes and decodes an image in accordance with such a method.

In order to achieve the above-mentioned first object, as claimed in claim 1, the present invention is an image encoding method, comprising: a pattern matching step searching for a waveform vector similar to a partial signal waveform of an image signal in a predetermined group of waveform vectors; and a waveform pattern encoding step performing a compression encoding for information to identify the waveform vector searched for, similarity information to represent similarity between the partial signal waveform and the waveform vector searched for, and a position in an image of the partial signal waveform in accordance with a predetermined encoding rule, wherein the image signal is encoded from a combination of the information to identify the waveform vector, the similarity information and the position in the image of the partial signal waveform, and wherein the position in the image of the partial signal waveform is encoded through replacement with position information in a predetermined partial domain of the image signal.

In such an image encoding method, since the position in the image of the partial signal waveform that is the most similar to the waveform vector is encoded through the replacement with the position information in the predetermined partial domain of the image signal, it is possible to represent the position more compactly. In an image encoding process and an image decoding process according to the method, when an order in which each predetermined partial domain of the image signal is processed is determined, it is possible to identify a position in the image signal with respect to such a position representation.

The above-mentioned image signal may be a signal representing a moving image or a signal representing a still image. Also, the image signal may be any additional information that is helpful for a process to encode or decode the signals.

The similarity information representing the similarity between the partial signal waveform and the waveform vector is not limited as long as the information is a parameter representing the similarity. For example, as described in claim 2, the inner product of the partial signal waveform and the waveform vector may be used.

Additionally, as claimed in claim 2, the present invention is an image encoding method, comprising: a pattern matching step searching for a waveform vector in a predetermined group of waveform vectors based upon inner products of the waveform vectors and a partial signal waveform of an image signal; and a waveform pattern encoding step performing a compression encoding for information to identify the waveform vector searched for, an inner product value of the partial signal waveform and the waveform vector searched for, and a position in an image of the partial signal waveform in accordance with a predetermined encoding rule, wherein in a process in which the pattern matching step and the waveform pattern encoding step are iterated until a predetermined condition is satisfied, whenever encoding information is obtained at the waveform pattern encoding step, a reconstructed waveform of a partial signal waveform obtained from the encoding information is subtracted from the image signal so as to produce an image signal to be provided to the pattern matching step, and the image signal is encoded according to the encoding information obtained at the waveform pattern step until the predetermined condition is satisfied, and wherein the position in the image of the partial signal waveform is encoded through replacement with position information in a predetermined partial domain of the image signal.

When the number of points at which it is determined whether or not the partial waveform signal and the waveform vector match are decreased, it becomes possible to reduce the number of operations. From the viewpoint, as claimed in claim 3, in the above-mentioned pattern matching step, pixels formed of a predetermined power of 2×2 of an image signal represented by a predetermined pixel unit may be set as a unit, and a position in an image of a partial signal waveform to be encoded may be identified.

When a normal image characteristic is considered, it becomes possible to encode a position in a comparatively compact form. From the viewpoint, as claimed in claim 4, the predetermined partial domain may be divided into unit blocks to identify a position and may be stratified in a block domain formed of one unit block or a plurality of unit blocks based upon an inclusive relation, and the position in the image of the partial signal waveform may be encoded based upon a sequence of bits indicating whether or not each block domain of an individual layer includes a position of a partial signal waveform to obtain an inner product value of the partial signal waveform and a waveform pattern in a group of waveform patterns.

As claimed in claim 5, the image signal to be processed may be information representing a source image to be encoded. As claimed in claim 6, the image signal to be processed may be information representing a prediction residual image obtained by performing a motion compensation prediction for a source image to be processed. As claimed in claim 7, the image signal to be processed may be an encoding distortion signal generated by encoding a source image in accordance with a predetermined encoding rule. As claimed in claim 8, the image signal to be processed may be information representing a prediction residual image obtained by performing a motion compensation prediction for an encoding distortion signal generated by encoding a source image in accordance with a predetermined encoding rule.

As claimed in claim 11, an image encoder according to the above-mentioned image encoding method, comprises: a pattern matching part searching for a waveform vector similar to a partial signal waveform of an image signal in a predetermined group of waveform vectors; and a waveform pattern encoding part performing a compression encoding for information to identify the waveform vector searched for, similarity information to represent similarity between the partial signal waveform and the waveform vector searched for, and a position in an image of the partial signal waveform in accordance with a predetermined encoding rule, wherein the image signal is encoded from a combination of the information to identify the waveform vector, the similarity information and the position in the image of the partial signal waveform, and wherein the waveform pattern encoding part encodes the position in the image of the partial signal waveform through replacement with information regarding position in a predetermined partial domain of the image signal.

Similarly as claimed in claim 12, an image encoder according to the above-mentioned image encoding method, comprises: a pattern matching part searching for a waveform vector in a predetermined group of waveform vectors based upon inner products of the waveform vectors and a partial signal waveform of an image signal; and a waveform pattern encoding part performing a compression encoding for information to identify the searched waveform vector, an inner product value of the partial signal waveform and the waveform vector searched for, and a position in an image of the partial signal waveform in accordance with a predetermined encoding rule, wherein in a process in which operations on the pattern matching part and the waveform pattern encoding part are iterated until a predetermined condition is satisfied, whenever encoding information is obtained at the waveform pattern encoding part, a reconstructed waveform of a partial signal waveform obtained from the encoding information is subtracted from the image signal so as to produce an image signal to be provided to the pattern matching part, and the image signal is encoded according to the encoding information obtained by the waveform pattern part until the predetermined condition is satisfied, and wherein the position in the image of the partial signal waveform is encoded through replacement with position information in a predetermined partial domain of the image signal.

In order to achieve the above-mentioned first object, as claimed in claim 15, the present invention is an image encoding method, comprising: a first image encoding step performing a compression encoding for a first image signal per predetermined partial domain in accordance with a first encoding rule; and a second image encoding step performing a compression encoding for a second image signal per partial signal waveform of the second image signal in accordance with a second encoding rule, wherein a signal corresponding to an error signal between a first image signal provided to the first encoding step and a signal obtained by performing a local decoding process for encoding information obtained at the first image encoding step is set as a second image signal provided to the second image encoding step, and wherein the second image encoding step comprises: a pattern matching step searching for a waveform vector similar to a partial signal waveform of the second image signal in a predetermined group of waveform vectors; and a waveform pattern encoding step performing a compression encoding for information to identify the waveform vector searched for, similarity information to represent similarity between the partial signal waveform and the waveform vector searched for, and a position in the second image of the partial signal waveform in accordance with the second encoding rule, and wherein in the pattern matching step, a group of waveform vectors to be used is selected among a plurality of groups of waveform vectors based on a parameter used to perform the compression encoding at the first image encoding step and the position in the second image of the partial waveform signal.

According to such an image encoding method, a group of waveform vectors to be used is selected among a plurality of groups of waveform vectors based upon the parameter used for performing an encoding at the first image encoding step and the position in the second image of the partial waveform signal. As a result, it is possible to select a group of waveform vectors corresponding to a characteristic of each image to be encoded and to encode the image signal more appropriately.

The second image information is a signal corresponding to an error signal between a first image signal provided to the first encoding step and a signal obtained by performing a local decoding process for encoding information obtained at the first image encoding step. As a result, when the first image information provided to the first image encoding step is assumed to be a source image, the second image information corresponds to an encoding distortion signal generated by encoding the source image. In such a case, according to the image encoding method, it is possible to efficiently encode a signal corresponding to the error signal ending up with unnecessary additional information when the source image is encoded.

Also, the similarity information between the partial signal waveform and the waveform vector may be replaced with an inner product between them. In this case, as claimed in claim 16, the present invention is an image encoding method, comprising: a first image encoding step performing a compression encoding for a first image signal per predetermined partial domain in accordance with a first encoding rule; and a second image encoding step performing a compression encoding for a second image signal per partial signal waveform of the second image signal in accordance with a second encoding rule, wherein a signal corresponding to an error signal between a first image signal provided to the first encoding step and a signal obtained by performing a local decoding process for encoding information obtained at the first image encoding step is set as a second image signal provided to the second image encoding step, and wherein the second image encoding step comprises a pattern matching step searching for a waveform vector in a predetermined group of waveform vectors based upon inner products of the waveform vectors and a partial signal waveform of the second image signal; and a waveform pattern encoding step performing a compression encoding for information to identify the waveform vector searched for, an inner product value of the partial signal waveform and the waveform vector searched for, and a position in the second image of the partial signal waveform in accordance with the second encoding rule, wherein in a process in which the pattern matching step and the waveform pattern encoding step are iterated until a predetermined condition is satisfied, whenever encoding information is obtained at the waveform pattern encoding step, a reconstructed waveform of a partial signal waveform obtained from the encoding information is subtracted from the second image signal so as to produce a second image signal to be provided to the pattern matching step, and the second image signal is encoded according to the encoding information obtained at the waveform pattern step until the predetermined condition is satisfied, and wherein the position in the image of the partial signal waveform is encoded through replacement with position information in a predetermined partial domain of the image signal and in the pattern matching step, a group of waveform vectors to be used is selected among a plurality of groups of waveform vectors based on a parameter used to perform the compression encoding at the first image encoding step and the position in the second image of the partial waveform signal.

As claimed in claim 23, an image encoder that operates a process in accordance with the above-mentioned image encoding method, comprises: a first image encoding part performing a compression encoding for a first image signal per predetermined partial domain in accordance with a first encoding rule; and a second image encoding part performing a compression encoding for a second image signal per partial signal waveform of the second image signal in accordance with a second encoding rule, wherein a signal corresponding to an error signal between a first image signal provided to the first encoding part and a signal obtained by performing a local decoding process for encoding information obtained by the first image encoding part is set as a second image signal provided to the second image encoding part, and wherein the second image encoding part comprises: a pattern matching part searching for a waveform vector similar to a partial signal waveform of the second image signal in a predetermined group of waveform vectors; and a waveform pattern encoding part performing a compression encoding for information to identify the waveform vector searched for, similarity information to represent similarity between the partial signal waveform and the waveform vector searched for, and a position in the second image of the partial signal waveform in accordance with the second encoding rule, and wherein a second image signal is encoded based upon a combination of the information to identify the waveform vector, the similarity information and the position in the second image of the partial signal waveform, and wherein the pattern matching part comprises a plurality of groups of waveform vectors; and a waveform vector group selection part selecting a group of waveform vectors to be used among the groups of waveform vectors based upon a parameter used by the first image encoding part to perform the compression encoding and the position in the second image of the partial waveform signal.

Similarly, as claimed in claim 24, the present invention is an image encoder, comprising: a first image encoding part performing a compression encoding for a first image signal per predetermined partial domain in accordance with a first encoding rule; and a second image encoding part performing a compression encoding for a second image signal per partial signal waveform of the second image signal in accordance with a second encoding rule, wherein a signal corresponding to an error signal between a first image signal provided to the first encoding part and a signal obtained by performing a local decoding process for encoding information obtained by the first image encoding part is set as a second image signal provided to the second image encoding part, and wherein the second image encoding part comprises a pattern matching part searching for a waveform vector in a predetermined group of waveform vectors based upon inner products of the waveform vectors and a partial signal waveform of the second image signal; and a waveform pattern encoding part performing a compression encoding for information to identify the waveform vector searched for, an inner product value of the partial signal waveform and the waveform vector searched for, and a position in the second image of the partial signal waveform in accordance with the second encoding rule, wherein in a process in which operations on the pattern matching part and the waveform pattern encoding part are iterated until a predetermined condition is satisfied, whenever encoding information is obtained by the waveform pattern encoding part, a reconstructed waveform of a partial signal waveform obtained from the encoding information is subtracted from the second image signal so as to produce a second image signal to be provided to the pattern matching part, and the second image signal is encoded according to the encoding information obtained by the waveform pattern part until the predetermined condition is satisfied, and wherein the pattern matching part comprises a plurality of groups of waveform vectors; and a waveform vector group selection part selecting a group of waveform vectors to be used among the groups of waveform vectors based upon a parameter used by the first image encoding part to perform the compression encoding and the position in the second image of the partial waveform signal.

In order to achieve the above-mentioned first object, as claimed in claim 29, the present invention is an image decoding method for receiving compressed image information and reconstructing image information by decompressing the compressed image information per predetermined partial domain, the image decoding method comprising the steps of: decoding compressed image information regarding a predetermined partial domain in accordance with a predetermined decoding rule and obtaining information to identify a waveform vector, similarity information to represent similarity between a partial signal waveform and the waveform vector, and a position in an image of the partial signal waveform; reconstructing image information based upon the waveform vector identified from a predetermined group of waveform vectors by the information to identify a waveform vector, the similarity information, and the position in the image of the partial signal waveform; and decoding the position in the image of the partial signal waveform included in the compressed image information as information per predetermined partial image domain when the compressed image information is decoded.

Additionally, as claimed in claim 30, the present invention is an image decoding method for receiving compressed image information and reconstructing image information by decompressing the compressed image information per predetermined partial domain, the image decoding method comprising the steps of: decoding compressed image information regarding a predetermined partial domain in accordance with a predetermined decoding rule and obtaining information to identify a waveform vector, an inner product value of the waveform vector and a partial signal waveform, and a position in an image of the partial signal waveform; reconstructing image information based upon the waveform vector identified from a predetermined group of waveform vectors by the information to identify a waveform vector, the inner product value, and the position in the image of the partial signal waveform; and decoding the position in the image of the partial signal waveform included in the compressed image information as information per predetermined partial image domain when the compressed image information is decoded.

According to the above-mentioned image decoding methods, when a position in an image of a partial signal waveform is decoded through replacement with position information in a predetermined partial domain of the image signal, it is possible to reconstruct the position in the image of the partial signal waveform.

As claimed in claim 38, an image decoder that operates a process in accordance with the above-mentioned image decoding method, for receiving compressed image information and reconstructing image information by decompressing the compressed image information per predetermined partial domain, comprises: a first part decoding compressed image information regarding a predetermined partial domain in accordance with a predetermined decoding rule and obtaining information to identify a waveform vector, similarity information to represent similarity between a partial signal waveform and the waveform vector, and a position in an image of the partial signal waveform; and a second part reconstructing image information based upon the waveform vector identified from a predetermined group of waveform vectors by the information to identify a waveform vector, the similarity information, and the position in the image of the partial signal waveform, wherein the first part decodes the position in the image of the partial signal waveform included in the compressed image information as information per predetermined partial image domain when the compressed image information is decoded.

Additionally, as claimed in claim 39, the present invention is an image decoder for receiving compressed image information and reconstructing image information by decompressing the compressed image information per predetermined partial domain, comprising: a first part decoding compressed image information regarding a predetermined partial domain in accordance with a predetermined decoding rule and obtaining information to identify a waveform vector, an inner product value of the waveform vector and a partial signal waveform, and a position in an image of the partial signal waveform; and a second part reconstructing image information based upon the waveform vector identified by the information to identify the waveform vector from a predetermined group of waveform vectors, the inner product value, and the position in the image of the partial signal waveform, wherein the first part decodes the position in the image of the partial signal waveform included in the compressed image information as information per predetermined partial image domain when the compressed image information is decoded.

Additionally, the present invention is an image decoding method, comprising: a first image decoding step receiving a first compressed image and reconstructing a first image information by decompressing the first compressed image information per predetermined partial domain; a second image decoding step receiving a second compressed image and reconstructing a second image information by decompressing the second compressed image information per predetermined partial signal waveform; and an image synthesizing step obtaining output image information by synthesizing the first image information and the second image information, wherein in the second image decoding step, by decoding the second compressed image information in accordance with a predetermined decoding rule, information to identify a waveform vector, similarity information to represent similarity between a partial signal waveform and the waveform vector, and a position in an image of the partial signal waveform are obtained, and a group of waveform vectors to be used is selected among a plurality of predetermined groups of waveform vectors based upon a code parameter included in the first compressed image information provided to the first image decoding step and the position in the image of the partial waveform signal, and wherein the second image information is generated based upon the waveform vector identified by the information to identify the waveform vector in the selected group of waveform vectors, the similarity information and the position in the image of the partial signal waveform.

Additionally, the present invention is an image decoding method, comprising: a first image decoding step receiving a first compressed image and reconstructing a first image information by decompressing the first compressed image information per predetermined partial domain; a second image decoding step receiving a second compressed image and reconstructing a second image information by decompressing the second compressed image information per predetermined partial signal waveform; and an image synthesizing step obtaining output image information by synthesizing the first image information and the second image information, wherein in the second image decoding step, by decoding the second compressed image information in accordance with a predetermined decoding rule, information to identify a waveform vector, an inner product value of the waveform vector and a partial signal waveform, and a position in an image of the partial signal waveform are obtained, and a group of waveform vectors to be used is selected among a plurality of predetermined groups of waveform vectors based upon a code parameter included in the first compressed image information provided to the first image decoding step and the position in the image of the partial waveform signal, and wherein the second image information is generated based upon the waveform vector identified by the information to identify the waveform vector in the selected group of waveform vectors, the inner product value and the position in the image of the partial signal waveform.

an image decoder that operates a process in accordance with the above-mentioned image decoding method, comprises: a first image decoding part receiving a first compressed image and reconstructing a first image information by decompressing the first compressed image information per predetermined partial domain; a second image decoding part receiving a second compressed image and reconstructing a second image information by decompressing the second compressed image information per predetermined partial signal waveform; and an image synthesizing part obtaining output image information by synthesizing the first image information and the second image information, wherein the second image decoding part comprises a plurality of predetermined groups of waveform vectors; a first part decoding the second compressed image information in accordance with a predetermined decoding rule and obtaining information to identify a waveform vector, similarity information to represent similarity between a partial signal waveform and the waveform vector, and a position in an image of the partial signal waveform; a second part selecting a group of waveform vectors to be used among a plurality of predetermined groups of waveform vectors based upon a code parameter included in the first compressed image information provided to the first image decoding part and the position in the image of the partial waveform signal; and a third part generating the second image information based upon the waveform vector identified by the information to identify the waveform vector from the selected group of waveform vectors, the similarity information and the position in the image of the partial signal waveform.

the present invention is an image decoder, comprising: a first image decoding part receiving a first compressed image and reconstructing a first image information by decompressing the first compressed image information per predetermined partial domain; a second image decoding part receiving a second compressed image and reconstructing a second image information by decompressing the second compressed image information per predetermined partial signal waveform; and an image synthesizing part obtaining output image information by synthesizing the first image information and the second image information, wherein the second image decoding part comprises a plurality of predetermined groups of waveform vectors; a first part decoding the second compressed image information in accordance with a predetermined decoding rule and obtaining information to identify a waveform vector, an inner product value of a partial signal waveform and the waveform vector, and a position in an image of the partial signal waveform; a second part selecting a group of waveform vectors to be used among a plurality of predetermined groups of waveform vectors based upon a code parameter included in the first compressed image information provided to the first image decoding part and the position in the image of the partial waveform signal; and a third part generating the second image information based upon the waveform vector identified by the information to identify the waveform vector from the selected group of waveform vectors, the inner product value, and the position in the image of the partial signal waveform.

In order to achieve the above-mentioned second object, there is provided an image processing systems comprising combinations of the above-mentioned image encoder and image decoder.

BEST MODE FOR CARRYING OUT THE INVENTION

In the following, embodiments of the present invention will be described with reference to the accompanying drawings.

Figure 1:
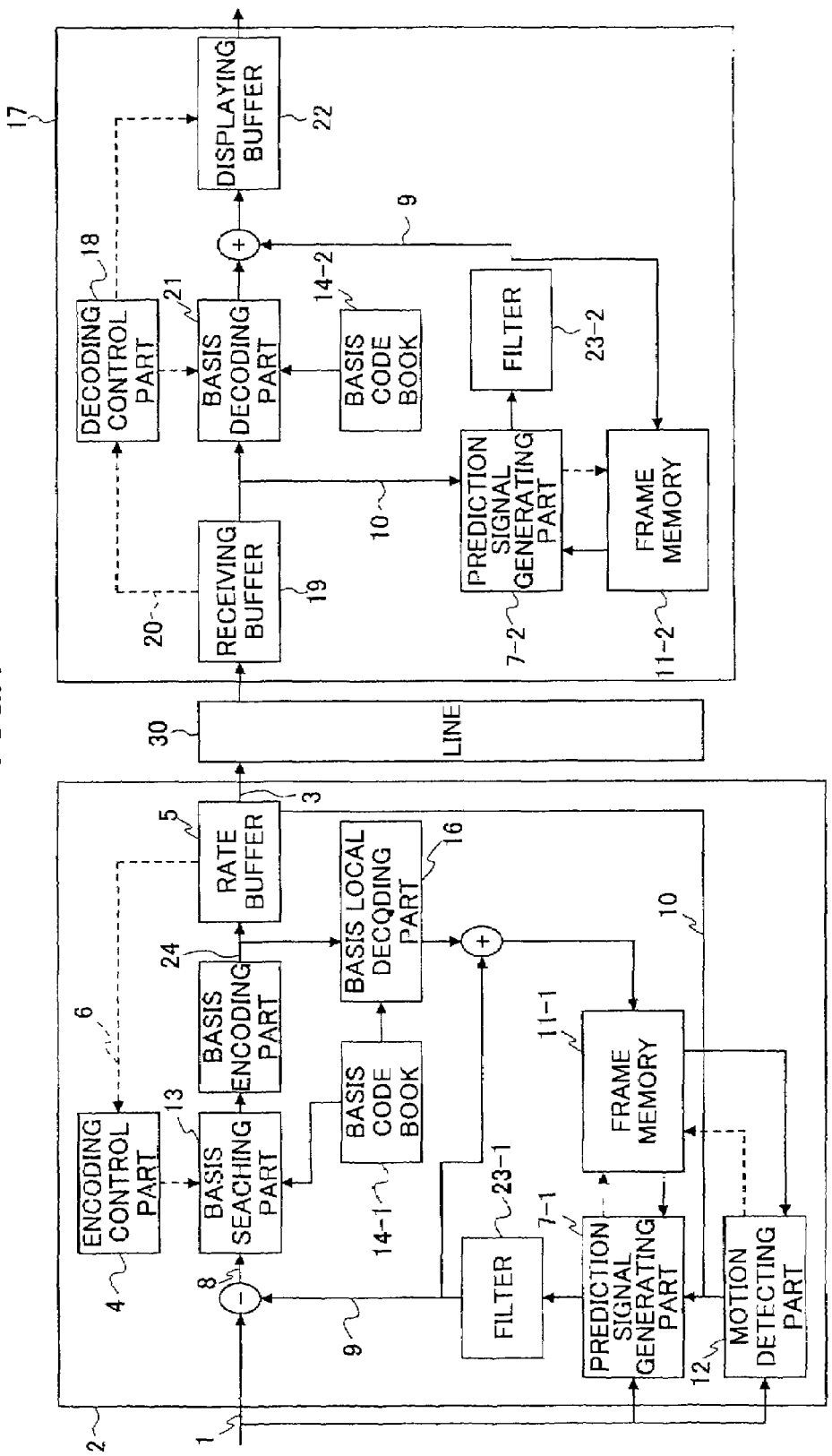
FIG. 1 is a block diagram illustrating an example of a structure of an image encoding and decoding system according to a first embodiment of the present invention.

For example, an image encoder and an image decoder according to the first embodiment of the present invention are constructed as is shown in FIG. 1. In the example, the "Matching Pursuits" (pattern matching) technique is used to perform a single layer picture encoding and decoding.

In FIG. 1, an image encoder 2 comprises an encoding control part 4, a rate buffer 5, a prediction signal generating part 7-1, a frame memory 11-1, a motion detecting part 12, a basis searching part 13, a basis code book 14-1, a basis encoding part 15, a basis local decoding part 16 and a filter 23-1. Also, an image decoder 17, which is connected with the image encoder 2 via a predetermined line 30, comprises a decoding control part 18, a receiving buffer 19, a basis decoding part 21, a displaying buffer 22, a filter 23-2, a frame memory 11-2, a prediction signal generating part 7-2 and a basis code book 14-2.

In the following, a description will be given of an operation on the image decoder 2 (encoding procedure).

The image encoder 2 performs a compression encoding for an individual frame of a picture signal 1, which is considered to be a unit. Furthermore, each frame is encoded per macroblock formed of 16 pixels×16 lines of a luminance signal. The encoded information is multiplexed to a bitstream 3 and is transmitted to the image decoder 17 via the line 30.

Figure 2:
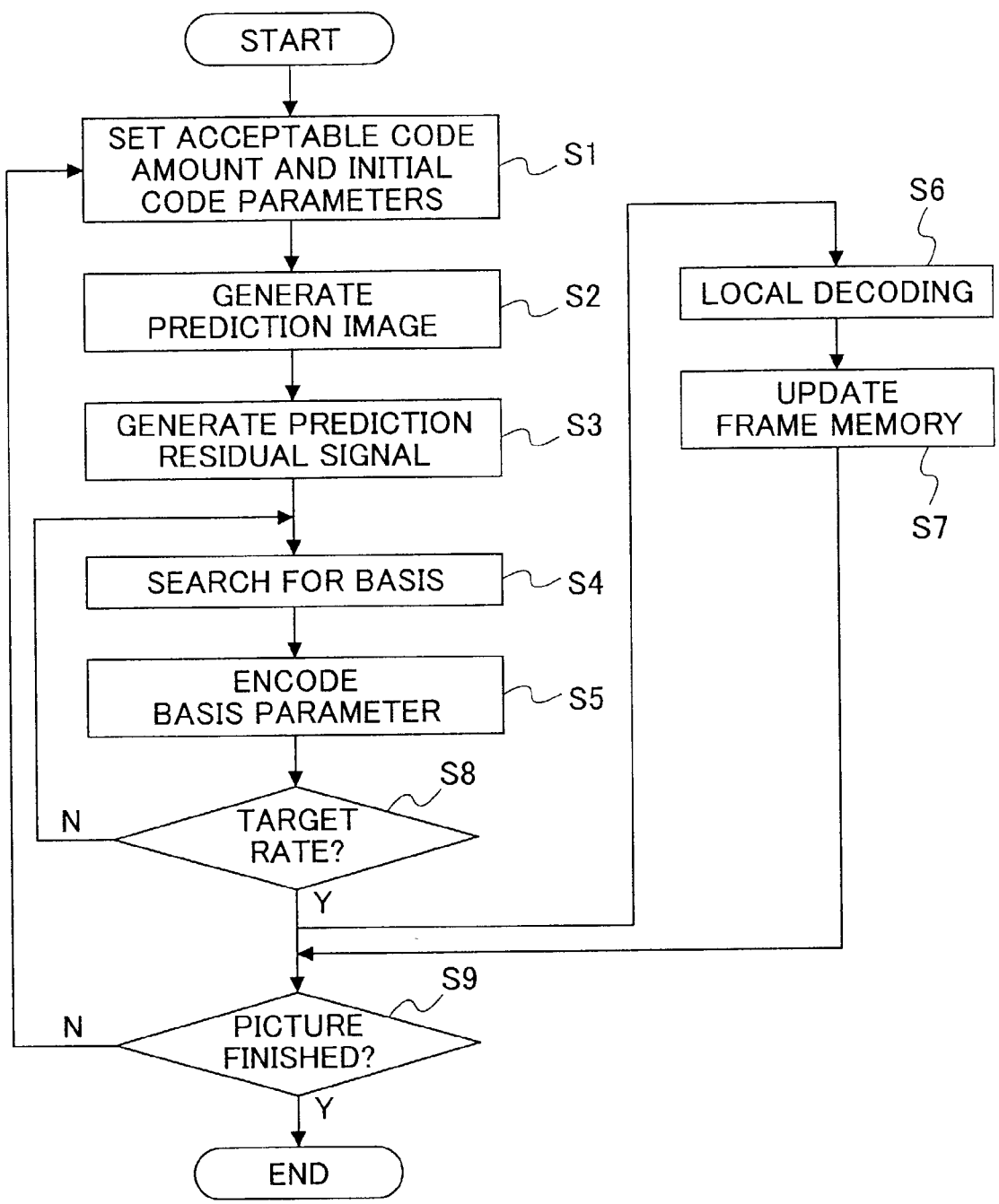
FIG. 2 is a flowchart illustrating an example of a procedure for an image encoding process.

For example, the encoding process is performed in accordance with a procedure shown in FIG. 2.

In FIG. 2, the encoding control part 4 sets initial parameters necessary for performing an encoding together with an acceptable code amount of the frame of interest (initialization: step S1). The code parameters include an initial quantization parameter and encoding mode information indicating whether or not the frame is encoded exclusively in the frame or whether or not the frame is encoded by using an inter frame prediction. In this embodiment of the present invention, a code amount in the frame mainly depends on the number of pieces of basis information to be encoded (hereinafter, referred to as an atom). The reason will be mentioned later. After the second frame, the acceptable code amount in the next frame is set by receiving a feedback of an occupied amount 6 to the encoding control part 4 so that the rate buffer 5 cannot overflow.

Next, the prediction signal generating part 7-1 generates a prediction image 9 to obtain a prediction residual signal 8 to be encoded (generate prediction image: step S2). The prediction image 9 is generated in accordance with a procedure shown in FIG. 4. The prediction image 9 is defined per macroblock.

Figure 4:
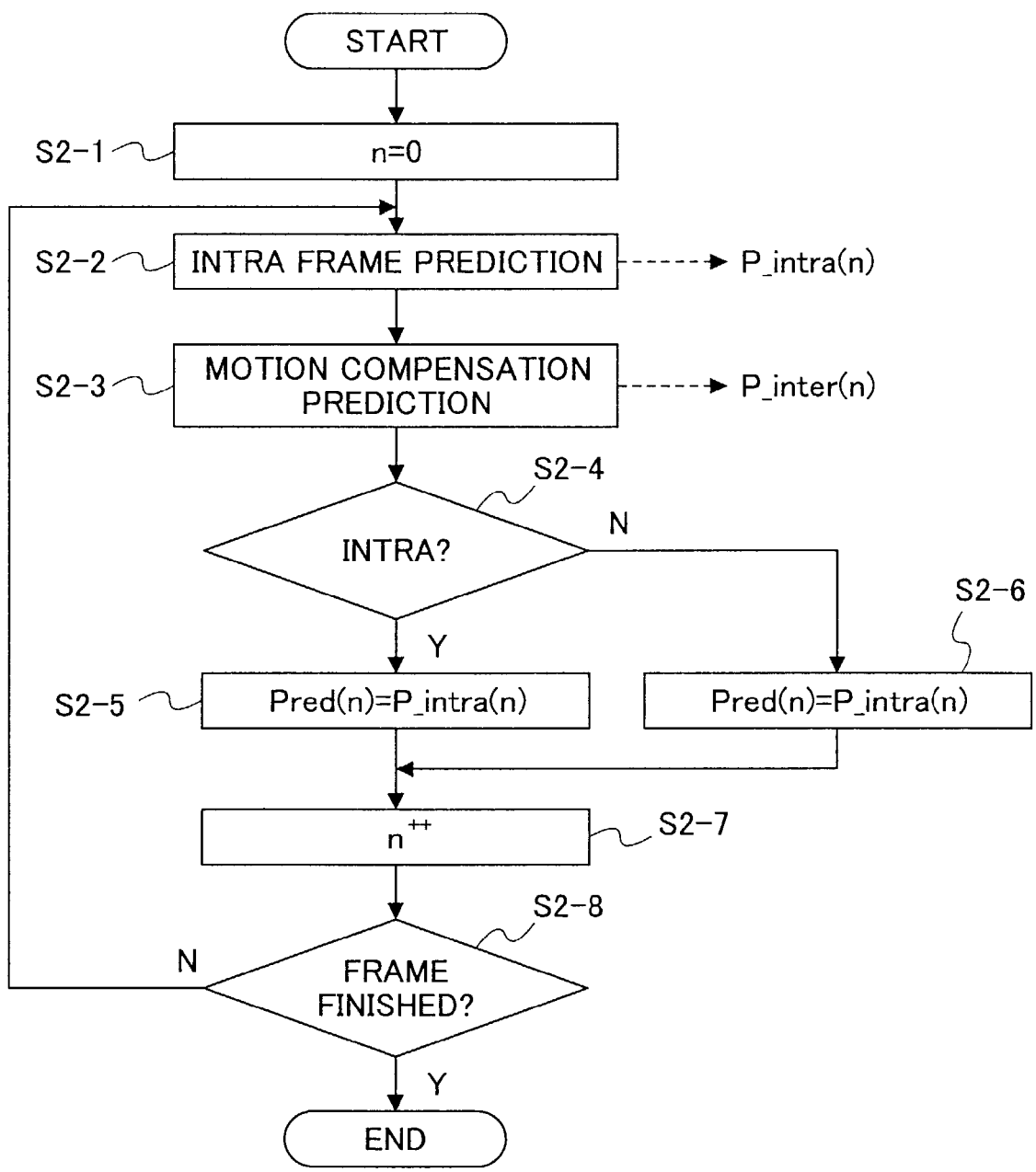
FIG. 4 is a flowchart illustrating an example of a procedure for a prediction image generating process.

In FIG. 4, a macroblock counter n is reset (step S2-1). Next, the intra frame prediction is performed for the macroblock n (step S2-2). A variety of intra frame prediction methods is assumed. For example, a pixel average of an input macroblock (DC component) may be used as a prediction image. Also, values of marginal pixels of the macroblock that have already been encoded are buffered, and the values may be used to generate a prediction image through a plane prediction. In step S2-2, a prediction cost incurred by the prediction image data (P_intra) and the intra frame prediction is computed. When a plurality of prediction methods are used, intra frame prediction mode information is also produced to indicate what type of intra frame prediction method has been used. Regarding the prediction cost, a sum of absolute difference (SAD) and a mean square error (MSE) may be used to represent residual power. Besides, a code amount-distortion cost representation including additional information required for an adopted prediction method (such as above-mentioned intra frame prediction mode information) may be used.

Then, an inter frame prediction is performed by a motion compensation prediction (step S2-3). The inter frame prediction identifies a similar image in reference images in the frame memory 11 by predicting a motion between frames and sets the identified similar image as a prediction image. The motion detecting part 12 detects a motion vector as information to identify the similar image in the reference images. The motion vector may be represented in any form such as a parallel shift vector by block matching often used in existing picture encoding methods, a vector representing an affine model, or a vector representing a perspective transform model. In general, the more complicated a model is and the larger are the number of motions that can be represented, the smaller the prediction residual is. On the other hand, since arithmetic operations for the motion detection and the number of parameters for the model representation increase corresponding to the above benefit, it is necessary to make a selection from the viewpoint of a balance between implementation burden and performance. Regarding motion vector search and representation method, any representation is available in this embodiment of the present invention as long as it can be represented as motion information representation having a macroblock as a unit.

Also, like an 8×8 pixel unit prediction mode of MPEG-4, a macroblock may be further divided into smaller blocks and a motion vector may be found for each divided block. Like a B frame prediction of MPEG-1/2, a plurality of frames may be referred to in order to perform a prediction. In a case in which a plurality of prediction methods are switched, inter frame prediction mode information is produced to indicate what type of prediction method has been used. The inter frame prediction mode may be such a mode that "Matching Pursuits" encoding data of an encoded frame is saved (for the storage, it is required to prepare a memory space to save an atom parameter 24 corresponding to the frame memory 11) and atom information encoded in a reference frame is inherited without change.

At step S2-3, prediction image data (P_inter), a motion vector, inter frame prediction mode information, and a prediction cost incurred by a motion compensation prediction are computed. Regarding the prediction cost, the SAD, the MSE and the code amount-distortion cost may be used like the intra frame prediction. As a code amount which should be considered in the inter frame prediction, there are a code amount of the motion vector itself, switch information of a motion vector model, and inter frame prediction mode information and so on.

At step S2-4, it is determined which type of prediction is performed for the macroblock of interest, the intra frame prediction (INTRA) or the inter frame prediction (INTER). The two above-mentioned prediction costs are used as an evaluation value with respect to the prediction and the prediction type incurring the smaller prediction cost is chosen. If the intra frame prediction (INTRA) is chosen, a prediction image Pred(n) for the macroblock n is set to a P_intra and the intra frame prediction mode information is output as output information 10 (step S2-5). If the inter frame prediction (INTER) is chosen, a prediction image Pred(n) is set to a P_inter and the inter frame prediction mode information together with a motion vector is output as the output information 10 (step S2-6). After that, the macroblock counter n is incremented (S2-7). If the above-mentioned process is completed for every macroblock in the frame, the prediction image generating process is completed.

Back to FIG. 2, after completing the above-mentioned prediction image generating process, regarding the generated prediction image 9, the filter 23-1 suppresses discontinuity in a boundary between blocks caused by the motion detection per macroblock. After that, a difference between the resulting prediction image and the input picture frame 1 is computed and becomes the prediction residual signal 8 to be encoded (generate prediction residual signal: step S3). The process on the filter 23-1 prevents any component unnecessary in the "Matching Pursuits" encoding process from being encoded.

The prediction residual signal 8 generated in the above-mentioned manner is input to the basis searching part 13 and is transformed in the form of a linear combination of basis vectors based upon the "Matching Pursuits" technique (step S4). The detailed description of a moving image encoding based upon the "Matching Pursuits" is referred to in "Very Low Bit-rate Video Coding Based on Matching Pursuits" (R. Neff et.al, IEEE Trans. on CSVT, vol.7, pp.158–171, February 1997). Regarding an extraction process of encoded data, this embodiment of the present invention follows a process mentioned in the above reference. The embodiment of the present invention has a characteristic in that the embodiment is designed to efficiently represent the extracted encoding data by using a small amount of code.

The "Matching Pursuits" technique in which a signal f is represented in the form of a linear combination of a set $g_k$ of predetermined over-complete basis functions (waveform patterns) searches for a basis $g_k$ such that an inner product of the $g_k$ and a signal $R_n f$ (a signal to be represented as a basis at the n searching step: partial signal waveform) is maximized. As is shown in the formula (1), the signal f is represented as a linear combination such that the linear combination has as its coefficients the inner values $$\langle R_n f, g_{k_n} \rangle. \quad (1)$$

$$f = \sum_{n=0}^{m-1} < R_n^f, g_{kn} > g_{kn} + R_m^f,$$

where n is the number of basis searching steps, $g_k$ is the basis found at the n-th searching step such that the inner product $<R_n f, g_{k_n}>$ is maximized, and $R_m f$ is a residual component to be searched for at the m-th searching step. Thus, as the number of steps n increases, the representation accuracy of the signal f is enhanced. That means that the larger the number of bases used to represent the signal f, the more accurately the signal f can be represented. Therefore, the larger the number of bases is, that is, the more times of searching steps there are, the more the code amount is and the smaller the distortion is.

An ideal basis search corresponds to a process for searching for a basis such that for every pixel in a frame, the above inner product is maximized among all predetermined bases (waveform patterns) with respect to a signal waveform whose center is the pixel. For that search, it is necessary to compute enormous arithmetic operations (the number of pixels in a frame)×(the number of bases) of the inner product. In order to decrease the number of arithmetic operations without the loss of optimality as much as possible, the above-mentioned reference proposes a method to detect a domain with high electric power and search for a basis in an area adjacent to the domain.

Figure 5:
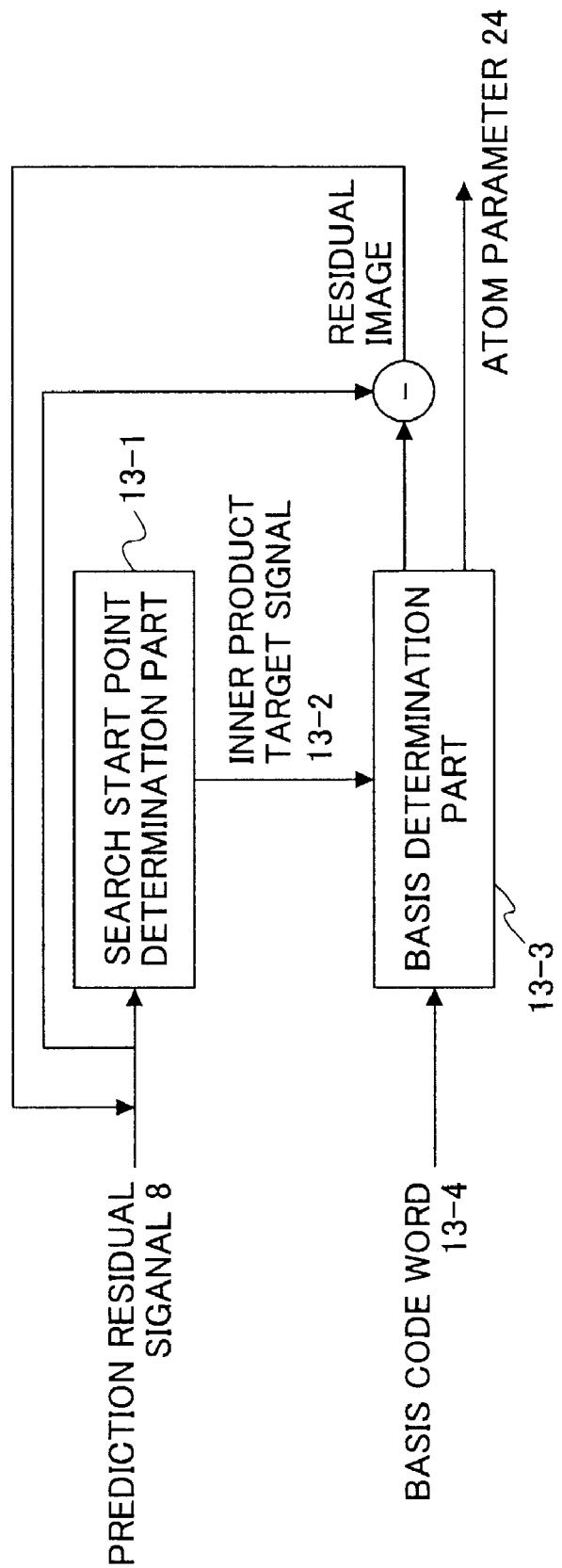
FIG. 5 is a block diagram illustrating a structure of a basis encoding part.

FIG. 5 shows a diagram illustrating a detailed structure of the basis searching part 13 according to the embodiment of the present invention.

In FIG. 5, the basis searching part 13 comprises a search start point determination part 13-1 and a basis determination part 13-3. The search start point determination part 13-1 receives the prediction residual signal 8 as its input and searches for a domain with the maximal electric power in the prediction residual signal 8. A position in the searched domain is considered as a start point of the basis search, and image data (partial signal waveform) of an area adjacent to the start point (for example, S pixels×S lines) is supplied to the basis determination part 13-3 as an inner product arithmetic target signal ($R_n$f) 13-2. The basis determination part 13-3 retrieves individual basis code words 13-4 from the basis code book 14, performs inner product operations of the inner product arithmetic target signal 13-2 and the individual basis code words 13-4, and determines a pair of signal and basis such that the inner product is maximized. Regarding the prediction residual signal 8, the basis $g_k$ is determined among basis vectors in the basis code book 14. Then, the basis determination part 13-3 outputs as a code parameter 24 a code number (an index) of the basis $g_k$, the inner product (basis coefficient) and a pixel position $p_k=(x_k, y_k)$ where the basis $g_k$ is applied. Here, the pixel position $p_n$ corresponds to a position of the center pixel of $R_n$f. A triple of the code parameters is referred to as an atom.

The basis determination part 13-3 supplies a signal reconstructed from the atom in accordance with the above formula (1). The reconstructed signal is subtracted from the prediction residual signal 8, and then the prediction residual signal is updated for the next searching step. Hereinafter, the searching step is incremented until the acceptable code amount is reached. The atom is determined for each of the searching steps.

In order to reconstruct the signal f by the image decoder 17, it is necessary to encode and transmit the atom parameter 24 extracted for each searching step. Back to FIG. 2, the basis encoding part 15 serves for this encoding operation (step S5). A basis index of the atom undergoes a compression encoding operation by means of a variable-length encoding corresponding to emergence frequency of the basis index, and a basis coefficient of the atom undergoes a compression encoding operation by means of a scalar quantization. (It is noted that the basis coefficient is quantized in the basis determination part 13-3 in FIG. 5 because the basis coefficient is required to represent a signal for each searching step and gives an influence to the basis searching process.) Furthermore, it is necessary to encode the position information $p_n$ of the atom. If the atom is supposed to be located at an arbitrary pixel position in the frame, there arises a problem in that a code amount required to represent the position increases.

Figure 6:
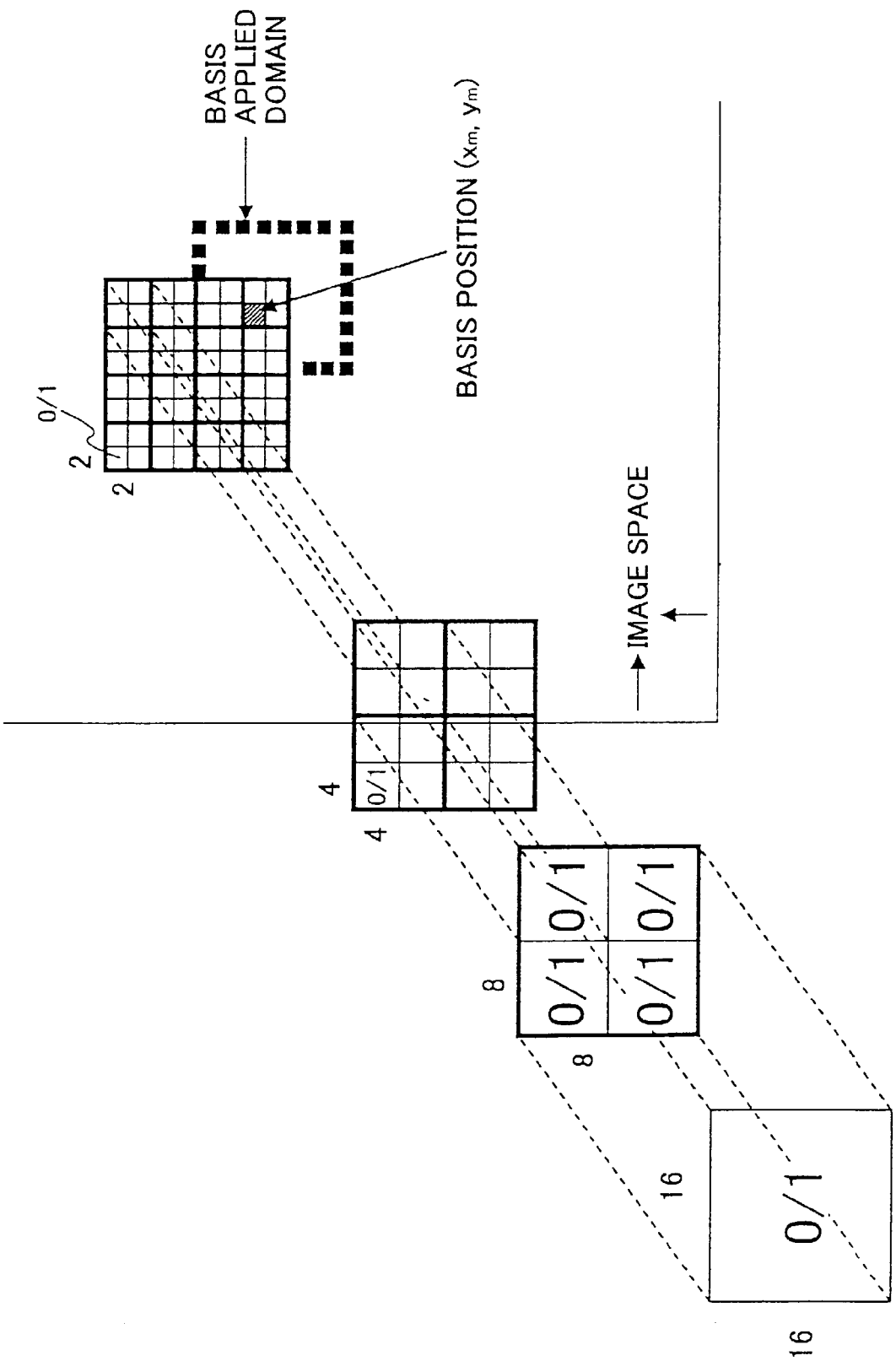
FIG. 6 is a diagram illustrating an example of a method for identifying a position of a basis search point in a macroblock.
Figure 7:
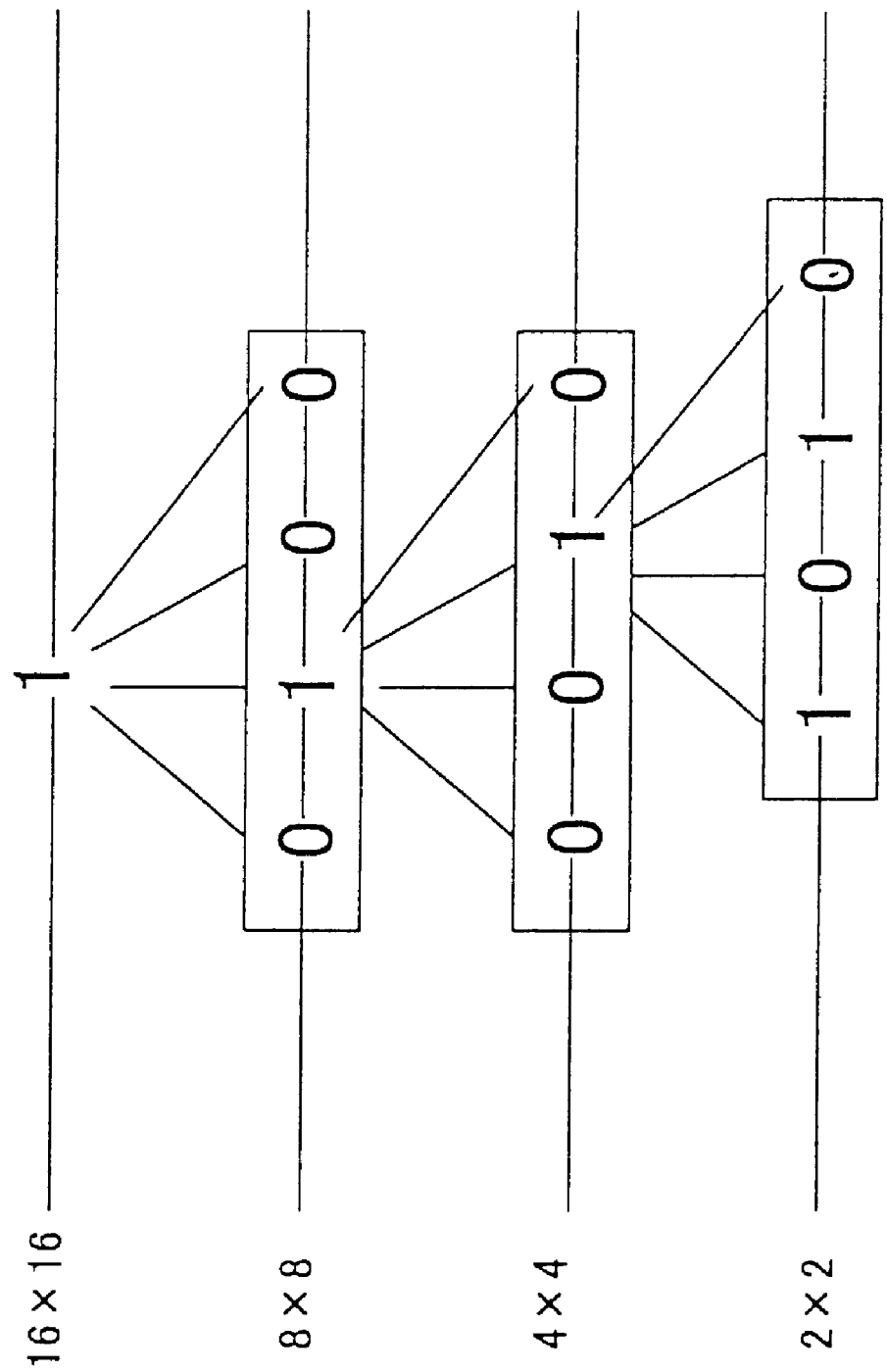
FIG. 7 is a diagram illustrating an example of position information of the basis search point identified in accordance with the method shown in FIG. 6.

Thus, in the embodiment of the present invention, feasable values to the position $p_n$ are restricted to multiplicative values of a 2×2 block. As a result, since the center of an atom is always located at a vertex of the 2×2 block, it can be determined per 2×2 block whether or not there is an atom to be encoded. Since the image encoder 2 and the image decoder 17 according to the embodiment of the present invention have a bitstream formed of a macroblock with 16×16 pixels as a unit, the information regarding whether or not the atom exists can be described as a four-layer quadrival tree structure whose root is a macroblock as shown in FIG. 6. FIG. 7 shows an example of a code representation of the quadrival tree structure.

In FIG. 7, the level of the macroblock (16×16) represents by 1 bit just whether there is an atom in an interior of the macroblock (1) or not (0). The level of block (8×8) represents by at most 4 bits how atoms are distributed in four 8×8 blocks included in the macroblock. Similarly, the level of block (4×4) and the level of block (2×2) have code representations by at most 16 bits and 64 bits, respectively. Here, if there appears a vertex having a code "0", not any code has to be assigned for successors of the vertex. For example, in a case in which there is no atom in a macroblock, the quadrival tree may have only one vertex information item. Also, according to a property of the prediction residual signal, atoms often tend to concentrate spatially. Thus, when an optimal variable-length code is designed based upon a conditional probability and an arithmetic code or the like is employed, it is possible to shorten an average code length by assigning a short code length for a tree having many 1s.

By applying the above-mentioned method, it is possible to decrease the number of basis searching points and the arithmetic operations thereof rather than the method to perform a search operation per pixel. Also, the above-mentioned method represents a position of the basis searching point $p_n$ as the position in the macroblock by using a tree structure whose root is the macroblock. As a result, whatever display size the image information has, it is possible to fix a maximal code amount required to identify the position of the basis searching point. Furthermore, in a domain where atoms do not concentrate, the tree structure makes it possible to represent the position $p_n$ of a basis searching point by a lesser code amount and decrease the code amount from a whole frame required to represent the position $p_n$ of each basis searching point, if general characteristics of an image are considered.

Whenever atoms are encoded for each of the above-mentioned search steps, it is determined at step S8 whether or not the code amount reaches the acceptable code amount. If the code amount reaches the acceptable code amount, the basis searching process is stopped and the encoding of the prediction residual signal of the frame of interest is terminated. Then, if there remain some frames (step S9), the process for the next frame is performed back to step S1. If there is no remaining frame, the process is terminated.

When the encoding process for atoms corresponding to one frame is completed, a local decoding process is performed and the frame memory 11 is updated so as to obtain a reference image for the motion compensation prediction after the next frame (the basis local decoding part 16, steps S6 and S7).

In the above-mentioned manner, the bitstream 3 including encoding information generated by the image encoder 2 is supplied to the image decoder 17 via the line 30.

On the other hand, the image decoder 17 receives the bitstream 3 including the above encoding information and performs the same process as the basis local decoding part 16. In a case in which an image is decoded and displayed in real time, the decoding process is performed in accordance with steps that will be mentioned with respect to FIG. 3.

Figure 3:
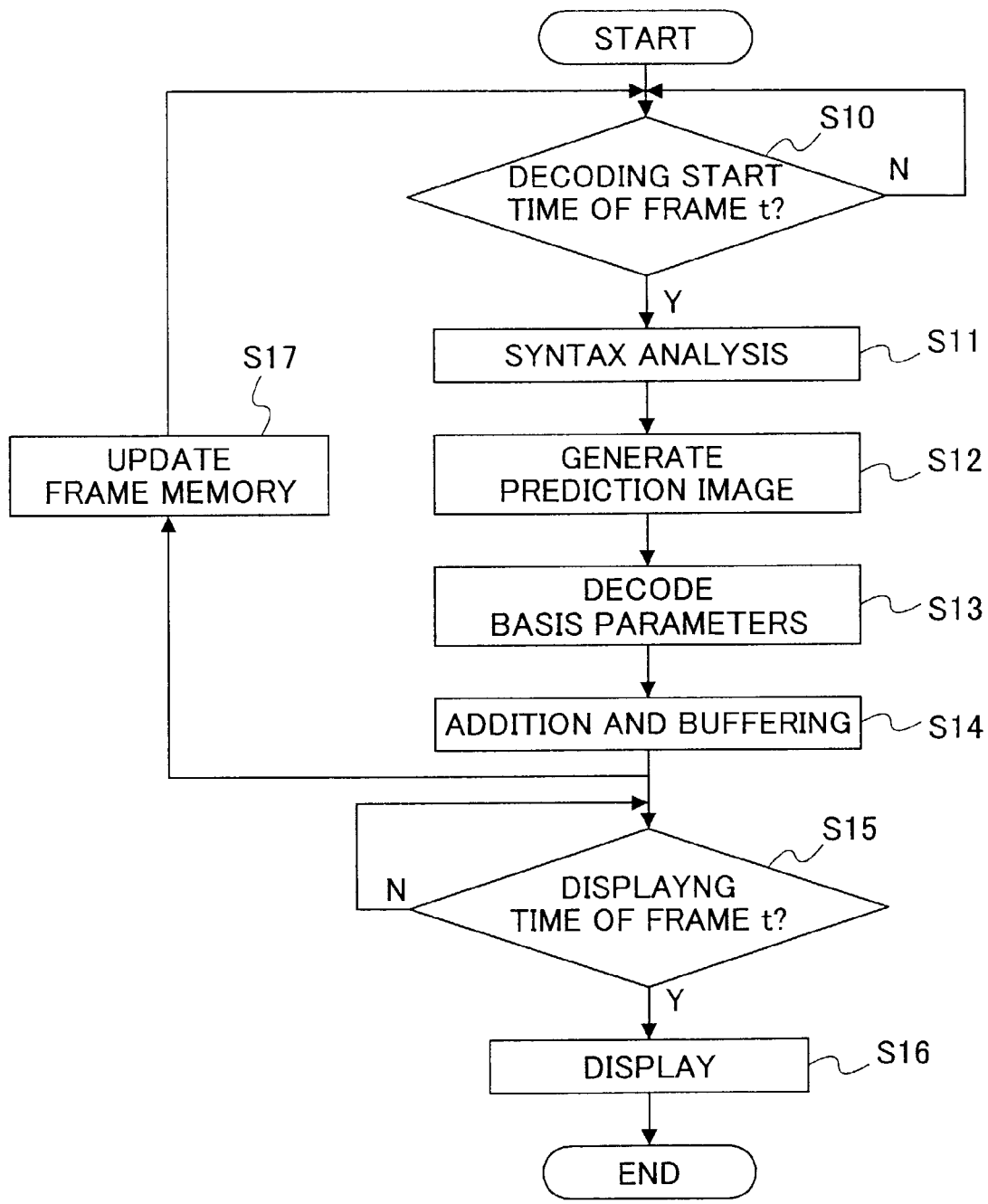
FIG. 3 is a flowchart illustrating an example of a procedure for an image decoding process.

In FIG. 3, based upon occupied information 20 of bitstream data saved in the receiving buffer 19, a time management function of the decoding control part 18 determines a decoding start time of a frame being at the time t and runs a basis decoding part 21 at the time (step S10). The basis decoding part 21 detects a frame synchronous word and analyzes atom data of the bitstream in accordance with a predetermined syntax rule (step S11). The prediction signal generating part 7-2 (which performs a process corresponding to the prediction signal generating part 7-1 in the image encoder 2) receives prediction result output information 10 including information regarding a motion vector and a prediction mode in the analyzed data, and then generates a prediction image 9 (step S12). An atom decoding process identifies a basis with reference to a basis index and a basis code book 14-2 equivalent to the basis code book 14-1 in the image encoder 2 and reconstructs a prediction residual signal f(x, y) based upon the formula (1) (step S13). The position information (ref. FIG. 6 and FIG. 7) regarding a macroblock where the basis is applied is transformed into a position in a frame of the prediction residual signal.

The prediction residual signal f(x, y) is generated by the prediction signal generating part 7-2, is processed by a filter 23-2 and is added as the prediction image 9. Then, a final frame decoding image is generated by using the above position in the frame. The decoded image is saved in a displaying buffer 22 (step S14) and is written in the frame memory 11 for the decoding process of the next frame. The displaying buffer 22 may be provided to use a portion of a frame memory 11-2.

At the displaying time that is prescribed in the bitstream or is determined according to a rule prescribed in the image decoder 2, the decoding control part 18 runs the displaying buffer 22 and displays the frame image being at the time t on the screen (steps S15 and S16).

In this embodiment of the present invention, when an atom, which is formed of code parameters, is encoded in accordance with the "Matching Pursuits" method, it is possible to efficiently encode per macroblock the atom that may be at an arbitrary position in a frame. That improves the overall coding efficiency.

Regarding FIG. 1, the line 30 may be a network such as the Internet or a data reading circuit for reading and decoding a bitstream from a medium in which an output result of the image encoder 2 is recorded.

A description will now be given of an image encoder and an image decoder according to a second embodiment of the present invention. Especially in this embodiment, a description will be given of an example of an image encoder and an image decoder to perform a quality hierarchical encoding and a transmission by using the "Matching Pursuits". In the image encoder and the image decoder according to the embodiment, the "Matching Pursuits" provides a basis representation of an encoding distortion signal, which is transmitted as additional information. As a result, when a line in use has a good condition, it becomes possible to transmit a high quality picture.

Figure 8:
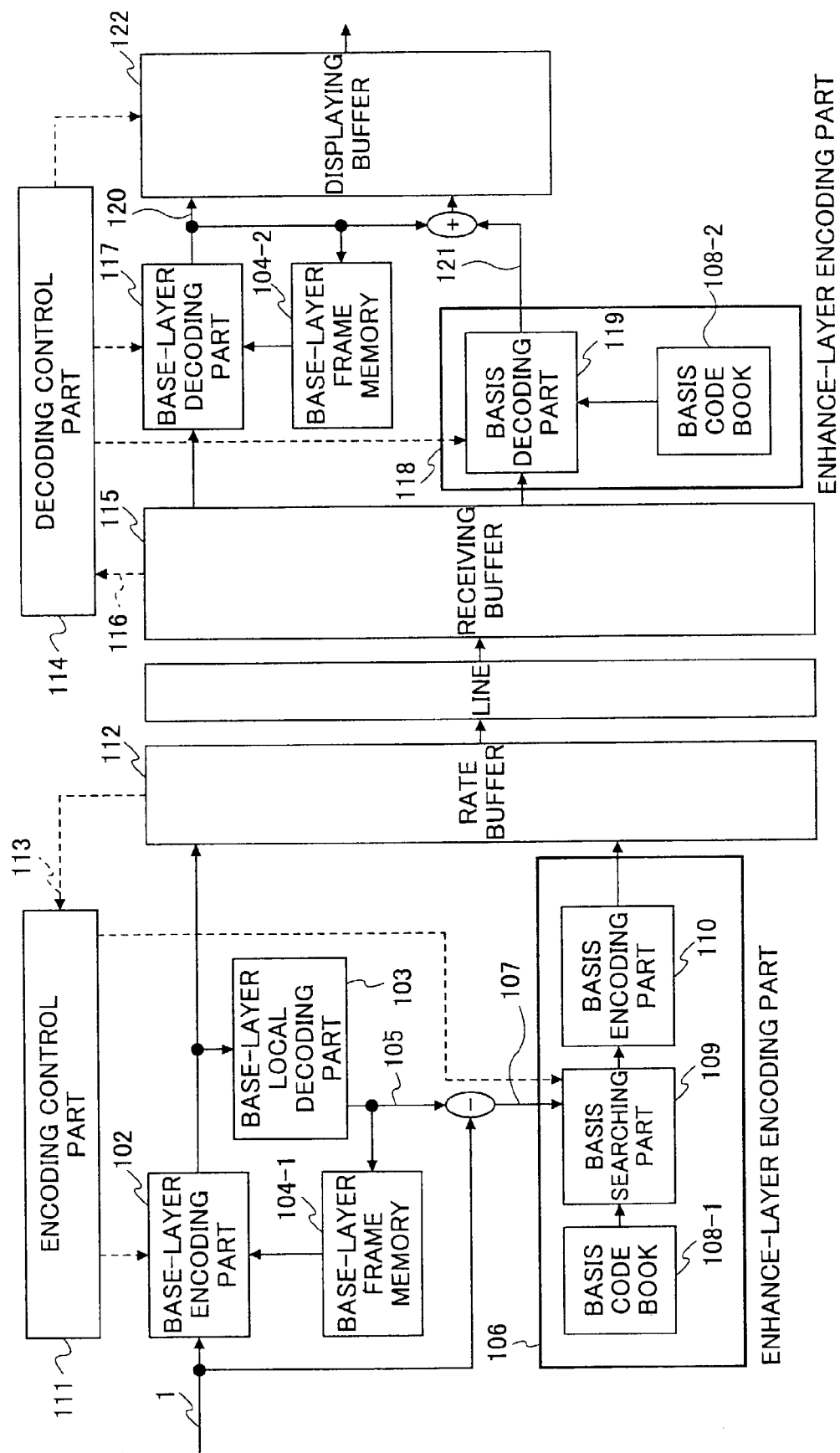
FIG. 8 is a block diagram illustrating an example of a structure of an image encoding and decoding system according to a second embodiment of the present invention.

FIG. 8 shows a structure of the image encoder and the image decoder according to the embodiment of the present invention.

In FIG. 8, the image encoder comprises an encoding control part 111, a base-layer encoding part 102, a base-layer local decoding part 103, a base-layer frame memory 104-1, an enhance-layer encoding part 106 and a rate buffer 112. The enhance-layer encoding part 106 for producing and encoding the basis representation of an encoding distortion signal comprises a basis code book 108-1, a basis searching part 109 and a basis encoding part 110.

On the other hand, the image decoder, which is connected with the image encoder via the line 30, comprises a decoding control part 114, a receiving buffer 115, a base-layer decoding part 117, a base-layer frame memory 104-2, an enhance-layer decoding part 118 and a displaying buffer 122. The enhance-layer decoding part 118 for decoding an encoding distortion signal transmitted from the image encoder as enhance-layer information comprises a basis decoding part 119 and a basis code book 108-2.

The image encoder performs a compression encoding for a picture signal (a source image) per frame. The image encoder represents a signal underlying a picture through a base layer encoding and encodes an encoding distortion signal, which is represented as a difference between the source image and the encoded image, in the enhance layer. For each layer, individual frames are encoded per macroblock formed of 16 pixels×16 lines of a luminance signal. After a base-layer bitstream and an enhance-layer bitstream are generated separately, an eventual bitstream is formed. In general, the image decoder is formed so as to perform an inter layer synthesis (in which a decoded image in the enhance layer, that is, an encoding distortion component, is added to a decoded image in the base layer) by using a time stamp of an individual frame. Since the bitstream in the base layer and the bitstream in the enhance layer are separated, it is possible to perform transmission control such that at a sending process, only the bitstream in the base layer is sent to the image decoder that can receive only the base layer.

Figure 9:
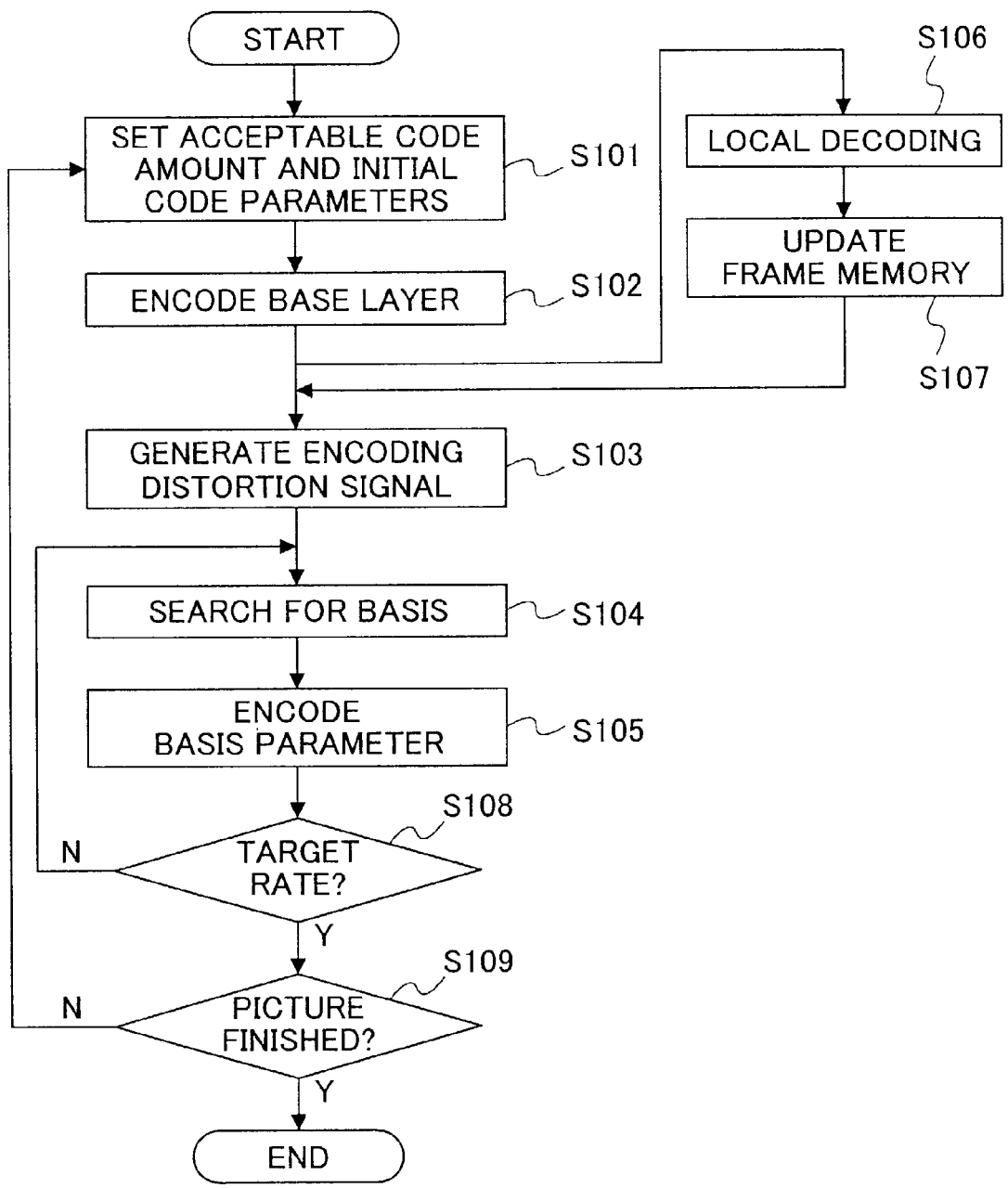
FIG. 9 is a flowchart illustrating an example of a procedure for an image encoding process.

The image encoder performs an encoding process, for example, in accordance with a procedure as shown in FIG. 9.

In FIG. 9, the encoding control part 111 sets initial code parameters necessary to perform an encoding together with an acceptable code amount of the frame of interest (step S1). The code parameters includes an initial quantization parameter and encoding mode information indicating whether or not a frame is encoded exclusively in the frame and whether or not the frame is encoded by using an inter frame prediction. (It is noted that in this embodiment of the present invention, the enhance layer has no inter frame prediction.) The code parameters are determined separately for the based layer and the enhance layer based upon an inter layer code amount allocation rule according to the use of an encoding and decoding system. As mentioned in the first embodiment of the present invention, an adjusting factor of the code amount in the enhance layer is mainly the number of atoms.

After the second frame, the acceptable code amount of the next frame is set by receiving a feedback of occupied amount 113 to the encoding control part 111 so that the rate buffer 112 cannot overflow.

The base-layer encoding part 102 encodes the picture signal 1 (the source image) in accordance with an arbitrary picture encoding method such as MPEG-4 video encoding method (ISO/IEC 14496-2) and TTU-T H.263 (step S102). Here, the picture signal 1 may be encoded in accordance with the "Matching Pursuits" method mentioned in the first embodiment of the present invention. Encoded data of an individual frame is decoded into a decoded image 105 by the base-layer local decoding part 103 and is saved in the frame memory 104-1 so as to perform a motion compensation prediction after the next frame.

A base-layer encoding distortion signal 107 is generated by computing a difference between the input picture signal 1 and the decoded image 105 in the base layer (step S103). The enhance-layer encoding part 106 encodes the encoding distortion signal 107 based upon the "Matching Pursuits". A procedure of the "Matching Pursuits" encoding according to this embodiment (steps S104 through S109) is identical to the procedure mentioned in steps S4 through S9 (ref. FIG. 2) according to the first embodiment. It is noted that the enhance-layer encoding part 106 has no processing part serving to execute an inter frame motion compensation prediction process, because the enhance-layer encoding part 106 performs an intra frame encoding for the encoding distortion signal 107. The basis searching part 109 and the basis encoding part 110 perform processes corresponding to the basis searching part 13 and the basis encoding part 15 shown in FIG. 1, respectively.

It is noted that although the basis code book 108-1 has the same constitution as the basis code book 14-1 shown in FIG. 1, a basis pattern, that is, a code word, may be redesigned to adapt a characteristic of the encoding distortion signal 107. Especially, when employing a conventional picture encoding method in which the DCT is used to encode the base layer, there appears a visually noticeable pattern in the base layer such as a block distortion peculiar to the DCT. The use of the basis code book aiming at such a pattern makes it possible to efficiently encode the enhance layer.

The image decoder receives a bitstream transmitted from the image encoder and synchronously performs each decoding process of the base layer and the enhance layer. When an image is decoded and displayed in real time, the decoding process, for example, follows the procedure shown in FIG. 10.

Figure 10:
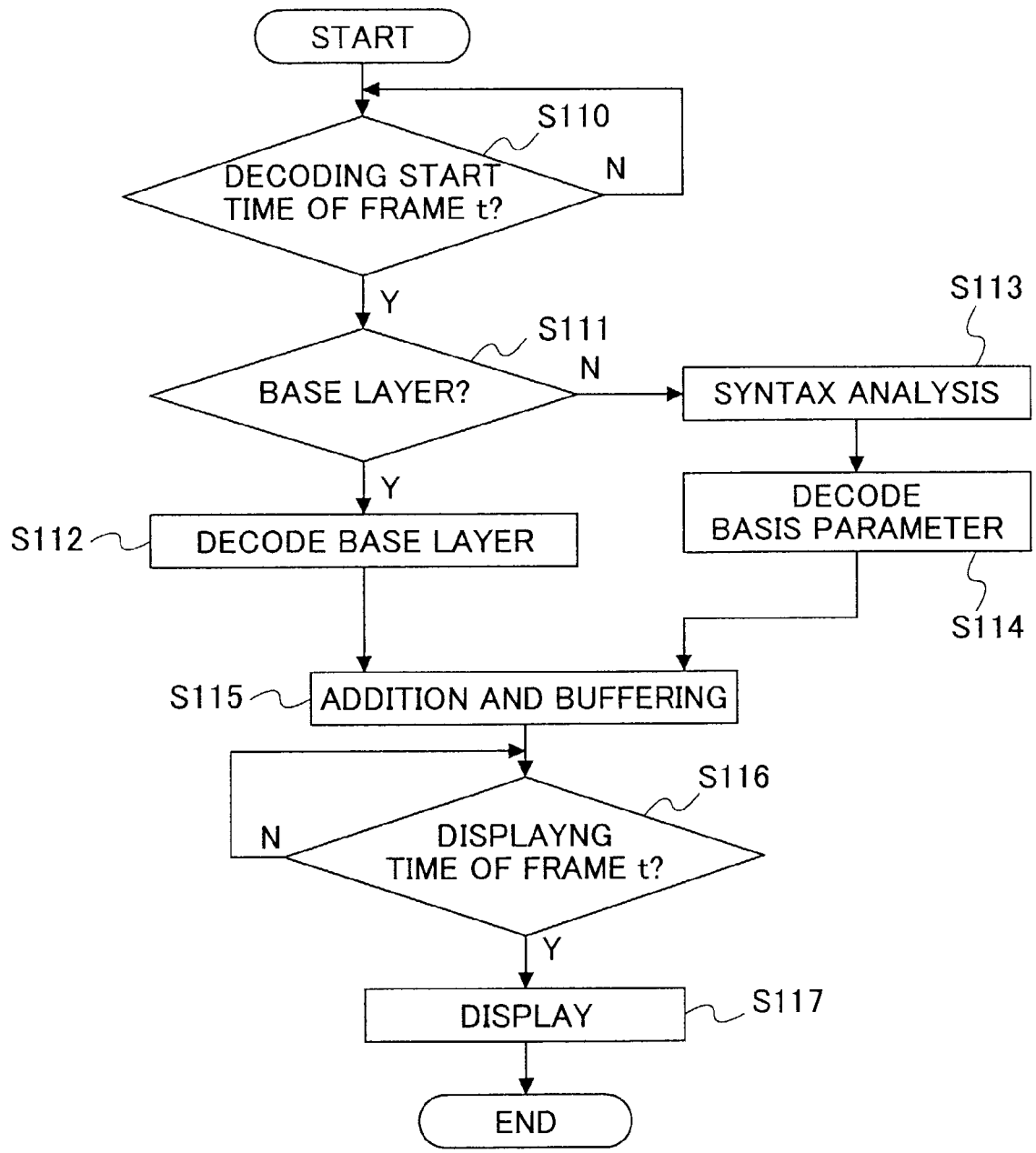
FIG. 10 is a flowchart illustrating an example of a procedure for an image decoding process.

In FIG. 10, based upon occupied amount information 116 of a bitstream data saved in the receiving buffer 115, a time management function of the decoding control part 114 determines a decoding start time of a frame being at the time t. When the time comes (step S110), the time management function of the decoding control part 114 runs the base-layer decoding part 117 and the basis decoding part 119 of the enhance-layer decoding part 118 (steps S111 through S113). While performing a motion compensation process, the basis-layer decoding part 117 uses the frame memory 104 to generate a decoded image 120 in the base layer (step S112). The basis decoding part 119 analyzes atom data in the bitstream in accordance with a predetermined syntax rule (step S113). In an atom decoding process, a basis is identified by the basis code book 108-2 similar to that of the image encoder based upon a basis index, and an encoding distortion decoded image 121 is generated based upon the formula (1) (step S114). In order to generate a high quality image including the enhance layer, the base-layer decoded image 120 is added to the encoding distortion decoded image 121 and the resulting image is written in the displaying buffer 122 (step S115). There is a case in which the enhance layer is not properly sent to the image decoder depending on a line condition. In such a case, only the base-layer decoded image 120 is written in the displaying buffer 122 and is displayed. The displaying buffer 122 may is provided to use a portion of the base-layer frame memory 104-2. At the displaying time that is prescribed by the bitstream or is determined according to a rule prescribed in the image decoder, the decoding control part 114 runs the displaying buffer 122 and displays the frame being at the time t on the screen (steps S116 and S117).

In this embodiment of the present invention, the encoded data by the "Matching Pursuits" is used in the enhance layer to form a quality hierarchical code. As a result, it is possible to efficiently represent without distortion a visually noticeable pattern such as a block distortion generated by the base-layer encoding by means of the DCT.

Regarding FIG. 8, a line 123 may be a network such as the Internet or a data reading circuit for reading and decoding a bitstream from a medium in which an output result of the image encoder is recorded.

A description will now be given of an image encoder and an image decoder according to a third embodiment of the present invention.

In this embodiment, a description will be given of another example of an image encoder and an image decoder to perform a quality hierarchical encoding and a transmission by using the "Matching Pursuits". In the image encoder and the image decoder according to the embodiment, unlike the second embodiment of the present invention, an encoding distortion signal to be encoded is divided into a plurality of classes of signal patterns, and a signal pattern is classified without the use of additional information with reference to code parameters in the base layer. A control part is designed to use a code book aiming at an individual pattern. As a result, it is possible to perform the "Matching Pursuits" encoding more efficiently.

Figure 11:
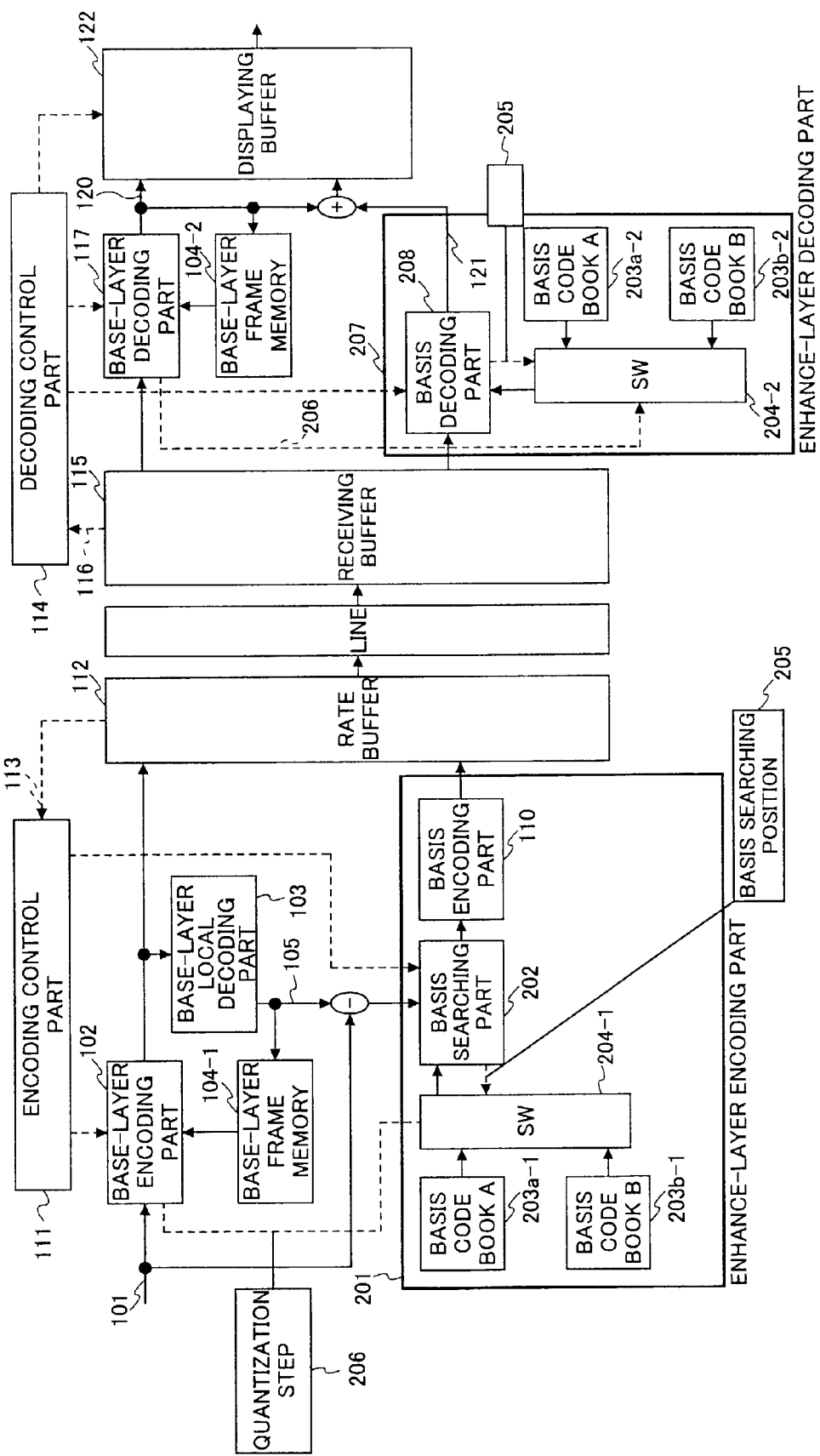
FIG. 11 is a block diagram illustrating an example of a structure of an image encoding and decoding system according to a third embodiment of the present invention.

FIG. 11 shows a structure of the image encoder and the image decoder according to the embodiment of the present invention, wherein those parts in FIG. 11 corresponding to the parts described in FIG. 8 are designated by the same reference numerals.

In FIG. 11, the image encoder uses an enhance-layer encoding part 201 whose structure is different from that of the enhance-layer encoding part 106 shown in FIG. 8. The enhance-layer encoding part 201 comprises a basis searching part 202, basis code books 203*a*-1 and 203*b*-1, a switch SW 204-1 and a basis encoding part 110. Also, the image decoder uses an enhance-layer decoding part 207 whose structure is different from that of the enhance-layer decoding part 118 shown in FIG. 8. The enhance-layer decoding part 207 comprises a basis decoding part 208, basis code books 203*a*-2 and 203*b*-2, and a switch SW 204-2.

An encoding process of the above image encoder basically follows the process mentioned with respect to the second embodiment of the present invention. Namely, after completing the initialization process (ref. S101 in FIG. 9) and the base-layer encoding process (ref. S102 in FIG. 9), the encoding process is performed for the encoding distortion signal, which is to become enhance information. The enhance-layer encoding process is performed as follows.

From a difference between an input picture signal 101 and a decoded image 105 in the base layer, a base-layer encoding distortion signal 107 is generated. An enhance-layer encoding part 201 encodes the base-layer encoding distortion signal 107 based upon the "Matching Pursuits". The enhance-layer encoding part 201 of the embodiment has two kinds of basis code books A and B (referred to as 203*a*-1 and 203*b*-1, respectively). It is supposed that the basis code book A 203*a*-1 specifically aims at a block distortion arising when the DCT is performed for the base layer and the basis code book B 203*b*-1 aims at an application to a signal pattern other than the block distortion. When the block distortion caused by a DCT quantization noticeably arises in a decoding image in the base layer, the component corresponding to the distortion also arises in the encoding distortion signal 107. The coarser the quantization is, the more noticeably the component arises. In addition, since a position of the boundary between blocks is fixed, it can be determined whether or not to use the code book aiming at the block distortion based upon a quantization step value in the base layer and a signal position in which a basis is being searched. For the implementation, the switch SW 204-1 for switching the basis code books A/B is used. When receiving a quantization step value 206 in the base-layer and a signal position 205 in which a basis is being searched, the switch SW 204-1 determines which to use the basis code book A or B in accordance with a predetermined criterion so as to employ a basis vector thereof.

In this case, since the switch SW 204-2 in the image decoder uses an existing value as determination information, it is unnecessary to transmit some additional information for the determination and it is possible to efficiently perform the "Matching Pursuits" encoding process dynamically adaptable to the signal pattern.

The basis searching part 202 operates similarly to the basis searching part 109 mentioned in the second embodiment except that the basis searching part 202 supplies the signal position in which a basis is being searched for to the switch SW204-1.

The above image decoder uses the enhance-layer decoding part 207 only whose structure is different from that of the enhance-layer decoding part 118 (ref. FIG. 8) in the second embodiment. The basis decoding part 208 operates similarly to the basis decoding part 119 mentioned in the second embodiment except that the basis decoding part 208 outputs atom position information 205 to the switch SW 204-2. Also, the switch SW 204-2 receives the quantization step value 206 at the corresponding position in the base layer from the base-layer decoding part 117. With reference to the atom position information 205 and the quantization step value 206, the switch SW 204-2 determines which basis code book A or B should be used in accordance with the same criterion as the enhance-layer encoding part 201.

In the above system structure, it is possible to classify an encoding distortion signal to be encoded by the "Matching Pursuits" into either a class of visually noticeable signal patterns such as a block distortion caused by encoding the base-layer with the use of the DCT or a class of other signal patterns with respect to the quality hierarchical encoding using the "Matching Pursuits" encoding. In addition, it is possible to use selectively the basis code book suitably for each class. At the same time, since the basis code book is segmented before the search, it is possible to decrease the number of arithmetic operations for searching an atom and shorten the code length of the basis index. When the base-layer encoding parameter is used to choose the basis code book, particular information is not required. More than or equal to two basis code books may be prepared. One basis code book may be divided into some classes.

In the embodiment, the description has been given of another example of the image encoder and the image decoder to perform a quality hierarchical encoding and a transmission by using the "Matching Pursuits". Unlike the structure of the second embodiment mentioned above, the embodiment introduces a motion compensation prediction so as to remove the redundancy in the time direction of the encoding distortion signal to be encoded. The use of the motion compensation prediction makes it possible to more efficiently encode the enhance layer.

A description will now be given of an image encoder and an image decoder according to a fourth embodiment of the present invention. In this embodiment, a description will be given of another example of the image encoder and the image decoder to perform a quality hierarchical encoding and a transmission by using the "Matching Pursuits". Unlike the structure of the second embodiment mentioned above, the embodiment introduces motion compensation prediction so as to remove the redundancy in the time direction of the encoding distortion signal to be encoded. The use of the motion compensation prediction makes it possible to more efficiently encode the enhance layer.

Figure 12:
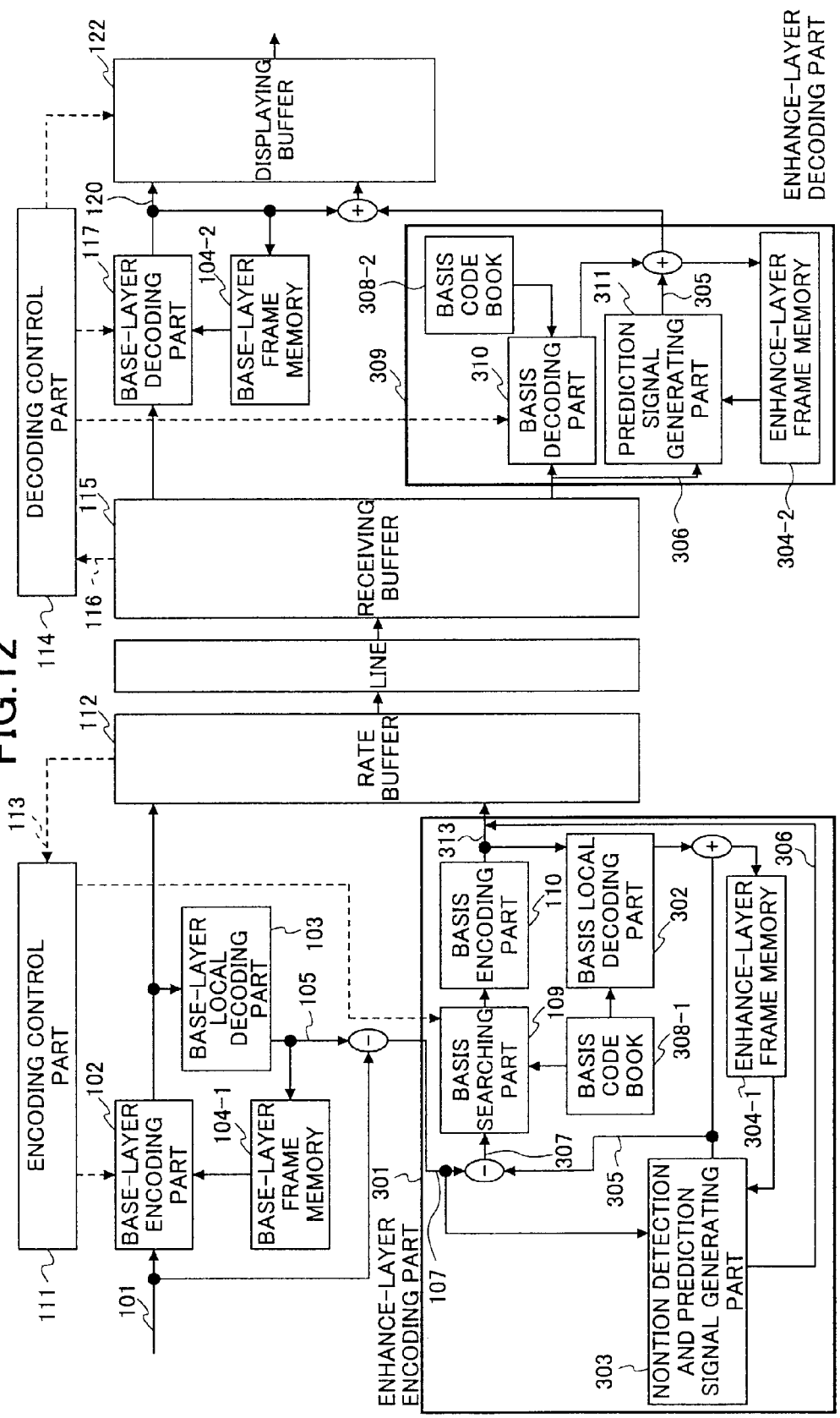
FIG. 12 is a block diagram illustrating an example of a structure of an image encoding and decoding system according to a fourth embodiment of the present invention.

FIG. 12 shows a structure of the image encoder and the image decoder according to the fourth embodiment of the present invention, wherein those parts in FIG. 12 corresponding to the parts described in FIG. 8 are designated by the same reference numerals.

In FIG. 12, the image encoder uses an enhance-layer encoding part 301 whose structure is different from that of the enhance-layer encoding part 106 shown in FIG. 8. The enhance-layer encoding part 301 comprises a basis searching part 109, a basis encoding part 110, a basis local decoding part 302, a motion detection and prediction signal generating part 303, an enhance-layer frame memory 304-1 and a basis code book 308-1. Also, the image decoder uses an enhance-layer decoding part 309 whose structure is different from that of the enhance-layer decoding part 118 shown in FIG. 8. The enhance-layer decoding part 309 comprises an enhance-layer frame memory 304-2, a basis code book 308-2, a basis decoding part 310 and a prediction signal generating part 311.

An encoding process of the above image encoder basically follows the process mentioned with respect to the second embodiment of the present invention. Namely, after completing the initialization process (ref. S101 in FIG. 9) and a base-layer encoding process (ref. S102 in FIG. 9), the encoding process is performed for the encoding distortion signal which is to become enhance information. The enhance-layer encoding process is performed as follows.

In the enhance-layer encoding part 301, an inter frame motion compensation prediction is performed for the encoding distortion signal 107, and the prediction residual signal 307 is encoded. The encoding distortion signal 107 depends upon an image pattern in the base layer. Since correlation between frames with respect to the encoding distortion signal can be also considered to be high, the execution of the motion compensation prediction makes it possible to decrease the redundancy in the time direction and perform an efficient encoding.

Figure 13:
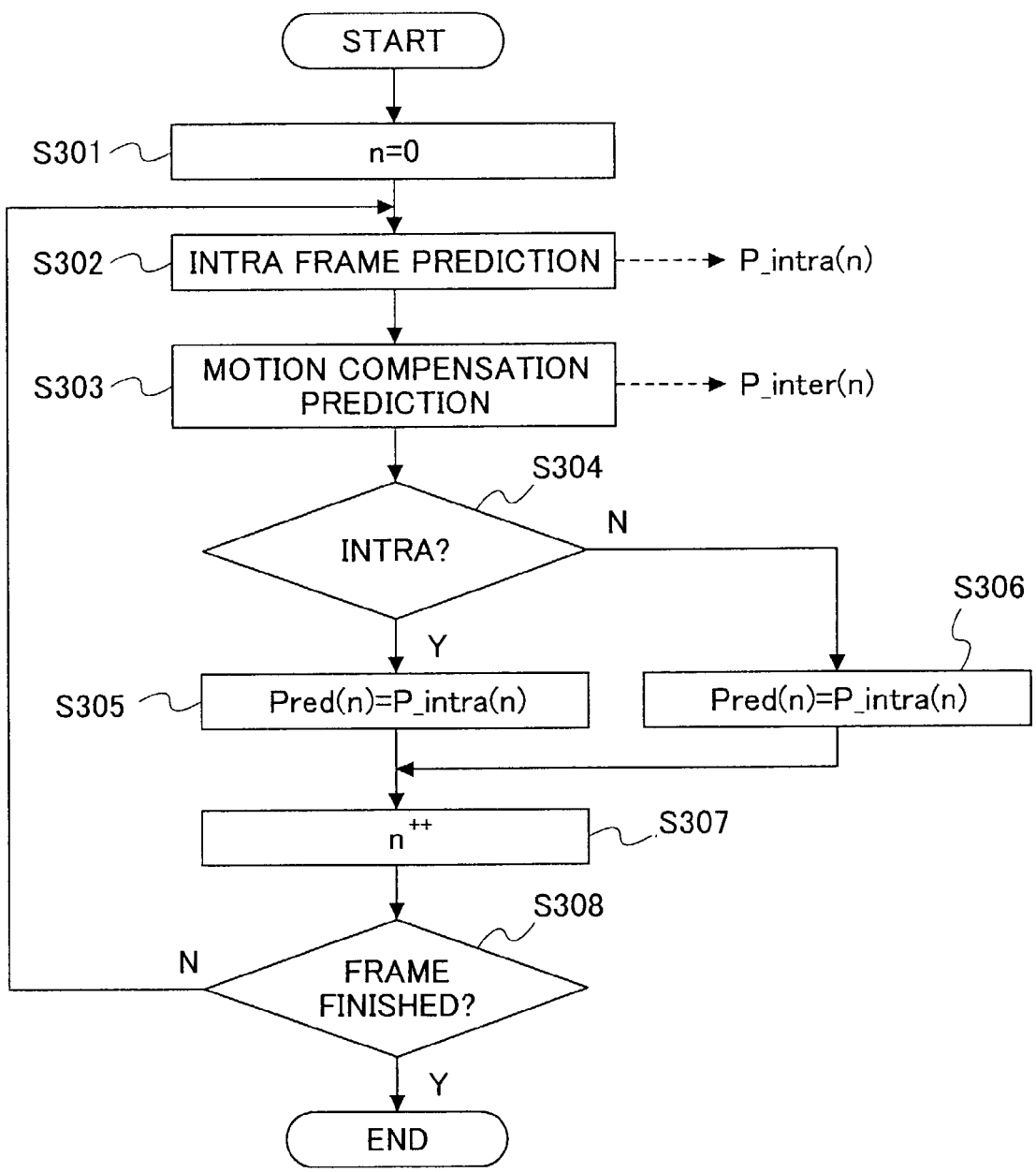
FIG. 13 is a flowchart illustrating an example of a procedure for an image encoding process.
Figure 14:
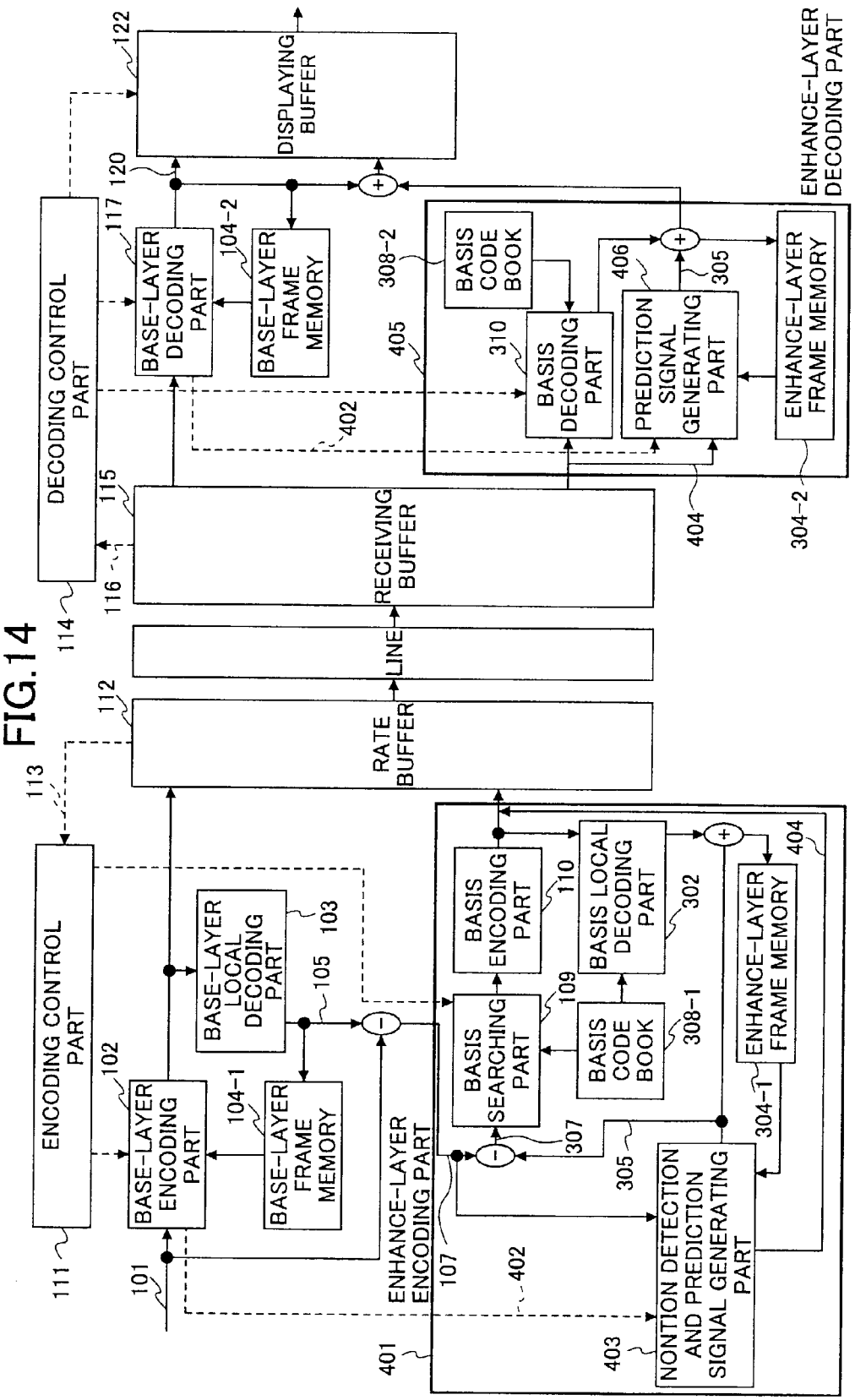
FIG. 14 is a block diagram illustrating a variation of an enhance-layer encoding part and an enhance-layer decoding part.

The enhance-layer encoding part 301 encodes the encoding distortion signal 107 based upon the "Matching Pursuits" with the motion compensation. FIG. 13 shows a procedure of the motion compensation prediction.

When the encoding distortion signal 107 is delivered to the motion detection and prediction signal generating part 303, a prediction signal 305 is generated. The prediction signal 305 is determined per macroblock. The macroblock counter n is reset (step S301). Then, the intra frame prediction is performed for the macroblock n (step S302). A variety of intra frame prediction methods is assumed. For example, a pixel average of an input macroblock (DC component) may be used as a prediction image. Also, values of marginal pixels of the macroblock that have already been encoded may be buffered, and the values may be used to generate a prediction image through a plane prediction.

In step S302, a prediction cost incurred by the prediction image data (P_intra) and the inter frame prediction is computed. When a plurality of prediction methods are used, intra frame prediction mode information is also produced to indicate what type of intra frame prediction method has been used. Regarding the prediction cost, a sum of absolute difference (SAD) and a mean square error (MSE) may be used to represent a residual power. Besides, a code amount-distortion cost representation including additional information required for a prediction method (such as above-mentioned intra frame prediction mode information) may be used.

Then, the inter frame prediction is performed through a motion compensation prediction (step S303). The inter frame prediction predicts a motion between frames and identifies a similar image in reference images in the enhance-layer frame memory 304-1. In motion detection, a motion vector is detected as information to identify the similar image in the reference images. The motion vector may be represented in any form such as a parallel shift vector by block matching often used in existing picture encoding methods, a vector representing an affine model, or a vector representing a perspective transform model. In general, the more complicated a model is and the larger the number of motions that can be represented, the smaller the prediction residual is. On the other hand, since arithmetic operations for the motion detection and the number of parameters for the model representation increase corresponding to the above benefit, it is necessary to make a selection from the viewpoint of a balance between implementation burden and performance. Regarding motion vector search and representation method, any representation is available in this embodiment of the present invention as long as it can be represented as motion information representation having a macroblock as a unit. Also, like an 8×8 pixel unit prediction mode of MPEG-4, a macroblock may be further divided into smaller blocks and a motion vector is found for each divided block. Like a B frame prediction of MPEG-1/2, a plurality of frames may be referred to in order to perform a prediction. In a case in which a plurality of prediction methods are switched, inter frame prediction mode information is produced to indicate what type of prediction method has been used. The inter frame prediction mode may be such a mode that "Matching Pursuits" encoding data of an encoded frame is saved (for the storage, it is required to prepare a memory space to save an atom parameter 24 corresponding to the frame memory 11) and atom information encoded in a reference frame is inherited without change. At step S303, prediction image data (P_inter), a motion vector, inter frame prediction mode information, and a prediction cost incurred by a motion compensation prediction are computed. Regarding the prediction cost, the SAD, the MSE and the code amount-distortion cost may be used like the intra frame prediction. As a code amount which should be considered in the inter frame prediction, there are a code amount of a motion vector itself, switch information of a motion vector model, inter frame prediction mode information and so on.

At step S304, it is determined which type of prediction is performed for the macroblock of interest, the intra frame prediction (INTRA) or the inter frame prediction (INTER). The two above-mentioned prediction costs are used as an evaluation value with respect to the predictions and the prediction incurring the smaller prediction cost is chosen. If the intra frame prediction (INTRA) is chosen, a prediction image Pred(n) for the macroblock n is set to a P_intra and the intra frame prediction mode information is output as output information 306. If the inter frame prediction (INTER) is chosen, a prediction image Pred(n) is set to a P_inter and the inter frame prediction mode information together with a motion vector are output as the output information 306 (steps S305 and S306). After that, the macroblock counter n is incremented (S307). If the above-mentioned process is completed for every macroblock in the frame (step S308), the prediction image generating process is completed.

A difference between the generated prediction image 305 and the encoding distortion signal 107 is computed. Then, the computed residual signal 307 is supplied to the basis searching part 109. Since the operations of the basis searching part 109 and the basis encoding part 110 are the same as that of the first embodiment of the present invention, the description thereof will be omitted. The basis code book 308-1 is designed to reflect the prediction residual pattern of the encoding distortion signal in the time direction.

Although not shown in the diagram, a plurality of prepared basis code books may be switched according to the quantization step value in the base layer or atom position information similarly to the third embodiment. Especially regarding the atom position information, a discontinuous portion between macroblocks may arise in a prediction image because the motion detection by the enhance-layer encoding part 301 has a macroblock as a unit. Thus, it is possible to efficiently perform the "Matching Pursuits" if the code book suitable for the discontinuous signal pattern is prepared.

Motion vector and prediction mode information 306 together with an atom parameter 313 are multiplexed to a bitstream and are transmitted to the image decoder. The encoded atom parameter 313 is sent to the basis local decoding part 302 and a decoded image of the prediction residual signal 307 is generated. The decoded image is saved in the enhance-layer frame memory 304-1 for encoding the next frame.

In the above image decoder, only the structure of the enhance-layer decoding part 309 is different from that of the enhance-layer decoding part 118 in the second embodiment (ref. FIG. 8). In the enhance-layer decoding part 309, the basis decoding part 310 performs the same operations as the basis local decoding part 302 with reference to the basis code book 308-2. The prediction signal generating part 311 generates a prediction image 305 according to the motion vector and prediction mode information 306. The decoding control part 114 controls operations of each decoding part so that frames of the base layer and the enhance layer can be decoded synchronously. Other operations such as the displaying control follow the operation mentioned in the second embodiment.

According to the structure of the embodiment, in a quality hierarchical encoding using the "Matching Pursuits", if the motion compensation prediction is introduced for the encoding distortion signal to be encoded on the "Matching Pursuits", it is possible to more efficiently encode the enhance layer. The above-mentioned enhance-layer encoding part 301 and the enhance-layer decoding part 309 may be substituted for an enhance-layer encoding part 410 and an enhance-layer decoding part 405, respectively.

In this case, in the enhance-layer encoding part motion vector information obtained as an encoding result of the base layer is used as a motion vector of the macroblock which is located at the same position as the enhance layer. In order to simplify a process of a motion detection and prediction signal generating part 403 and decrease additional information to be transmitted, the enhance-layer encoding part 401 uses the motion vector of the macroblock located at the same position as the enhance layer which has been detected in the base layer to generate an inter frame prediction signal. In general, since a correlation of the image pattern between the base layer and the enhance layer is high in the quality hierarchical encoding, motion information detected in the base layer is often directly used in the enhance layer efficiently. Also, in order to increase the coding efficiency in the enhance layer, motion detection may use the base-layer motion information 402 as an initial value to be performed for an infinitesimal domain around the base-layer motion information 402. Since initial value regarding a motion searching point is given, it is sufficient to search a motion only in the neighborhood of the initial value and it is possible to reduce the number of arithmetic operations. In this case, a detection result in the enhance layer is sent to the image decoder as additional information, which is set as difference information 404 based upon the base-layer motion information 402. If the base-layer motion information 402 is directly used as the motion difference information 404, it is unnecessary to transmit the motion difference information 404.

In such a case in which the base-layer motion vector information is used to perform the enhance-layer motion compensation prediction in the enhance-layer encoding part 401, the enhance-layer decoding part 405 receives the base-layer motion information 402 from the base-layer decoding part 117 and uses the motion difference information 404 included in a bitstream in the enhance layer to generate the prediction image 305 in a prediction signal generating part 406.

INDUSTRIAL APPLICABILITY

As mentioned above, it is possible to realize the image encoding method and the image encoder and the corresponding image decoding method and the corresponding image decoder capable of improving the total coding efficiency by representing encoded data more compactly by means of the pattern matching technique. Also, it is possible to realize the image processing system that performs an image encoding and decoding in accordance with such a method mentioned in the previous claims.

The invention claimed is:

1. An image encoding method, comprising:
   a pattern matching step searching for a waveform vector in a predetermined group of waveform vectors based upon inner products of the waveform vectors and a partial signal waveform of an image signal; and
   a waveform pattern encoding step performing a compression encoding for information to identify the waveform vector searched for, an inner product value of the partial signal waveform and the waveform vector searched for, and a position in an image of the partial signal waveform in accordance with a predetermined encoding rule, wherein in a process in which the pattern matching step and the waveform pattern encoding step are iterated until a predetermined condition is satisfied, whenever encoding information is obtained at the waveform pattern encoding step, a reconstructed waveform of a partial signal waveform obtained from the encoding information is subtracted from the image signal so as to produce an image signal to be provided to the pattern matching step, and the image signal is encoded according to the encoding information obtained at the waveform pattern encoding step until the predetermined condition is satisfied, and wherein the position in the image of the partial signal waveform is encoded through replacement with position information in a predetermined partial domain of the image signal.

2. The image encoding method as claimed in claim 1, wherein in the pattern matching step, pixels formed of a predetermined power of 2×2 of an image signal represented by a predetermined pixel unit are set as a unit, and a position in an image of a partial signal waveform to be encoded is identified.

3. The image encoding method as claimed in claim 1, wherein the predetermined partial domain is divided into unit blocks to identify a position and is stratified in a block domain formed of one unit block or a plurality of unit blocks based upon an inclusive relation, and the position in the image of the partial signal waveform is encoded based upon a sequence of bits indicating whether or not each block domain of an individual layer includes a position of a partial signal waveform to obtain an inner product value of the partial signal waveform and a waveform pattern in a group of waveform patterns.

4. The image encoding method as claimed in claim 1, wherein the image signal to be processed is information representing a source image to be encoded.

5. The image encoding method as claimed in claim 1, wherein the image signal to be processed is information representing a prediction residual image obtained by performing a motion compensation prediction for a source image to be processed.

6. The image encoding method as claimed in claim 1, wherein the image signal to be processed is an encoding distortion signal generated by encoding a source image in accordance with a predetermined encoding rule.

7. The image encoding method as claimed in claim 1, wherein the image signal to be processed is information representing a prediction residual image obtained by performing a motion compensation prediction for an encoding distortion signal generated by encoding a source image in accordance with a predetermined encoding rule.

8. The image encoding method as claimed in claim 7, wherein when the information representing the prediction residual image is obtained, motion information detected by encoding the source image is used to perform the motion compensation prediction.

9. The image encoding method as claimed in claim 8, wherein the motion information detected by encoding the source image is set as an initial value, motion information is detected in positions adjacent to a position where a motion regarding the initial value occurs, and the motion information is used to perform the motion compensation prediction.

10. An image encoder, comprising:
a pattern matching part searching for a waveform vector in a predetermined group of waveform vectors based upon inner products of the waveform vectors and a partial signal waveform of an image signal; and
a waveform pattern encoding part performing a compression encoding for information to identify the waveform vector searched for, an inner product value of the partial signal waveform and the waveform vector searched for, and a position in an image of the partial signal waveform in accordance with a predetermined encoding rule, wherein in a process in which operations on the pattern matching part and the waveform pattern encoding part are iterated until a predetermined condition is satisfied, whenever encoding information is obtained at the waveform pattern encoding part, a reconstructed waveform of a partial signal waveform obtained from the encoding information is subtracted from the image signal so as to produce an image signal to be provided to the pattern matching part, and the image signal is encoded according to the encoding information obtained by the waveform pattern encoding part until the predetermined condition is satisfied, and wherein the position in the image of the partial signal waveform is encoded through replacement with position information in a predetermined partial domain of the image signal.

11. The image encoder as claimed in claim 10, wherein the pattern matching part sets pixels formed of a predetermined power of 2×2 of an image signal represented by a predetermined pixel unit as a unit and identifies a position in an image of a partial signal waveform to be encoded.

12. The image encoder as claimed in claim 11, wherein the predetermined partial domain is divided into unit blocks to identify a position and is stratified in a block domain formed of one unit block or a plurality of unit blocks based upon an inclusive relation, and the waveform pattern encoding part encodes the position in the image of the partial signal waveform based upon a sequence of bits indicating whether or not each block domain of an individual layer includes a position of a partial signal waveform to obtain an inner product value of the partial signal waveform and a waveform pattern in a group of waveform patterns.

13. An image decoding method for receiving compressed image information and reconstructing image information by decompressing the compressed image information per predetermined partial domain, the image the steps of:
decoding method comprising the steps of:
decoding compressed image information regarding a predetermined partial domain in accordance with a predetermined decoding rule and obtaining information to identify a waveform vector, an inner product value of the waveform vector and a partial signal waveform, and a position in an image of the partial signal waveform;
reconstructing image information based upon the waveform vector identified from a predetermined group of waveform vectors by the information to identify a waveform vector, the inner product value, and the position in the image of the partial signal waveform; and
decoding the position in the image of the partial signal waveform included in the compressed image information as information per predetermined partial image domain when the compressed image information is decoded.

14. The image decoding method as claimed in claim 13, wherein the predetermined partial domain is divided into unit blocks to identify a position and is stratified in a block domain formed of one unit block or a plurality of unit blocks based upon an inclusive relation, and position information that is encoded based upon a sequence of bits indicating whether or not each block domain of an individual layer includes a position of a partial signal waveform to obtain an inner product value of the partial signal waveform and any waveform pattern of a group of waveform patterns is decoded at the position in the image of the partial signal waveform.

15. The image decoding method as claimed in claim 13, wherein encoded information of a source image is decoded as compressed image information.

16. The image decoding method as claimed in claim 13, wherein encoded information of a prediction residual image obtained by performing a motion compensation prediction for a source image is decoded as compressed image information.

17. The image decoding method as claimed in claim 13, wherein encoded information of an encoding distortion signal generated by encoding a source image in accordance with a predetermined encoding rule is decoded as compressed image information.

18. The image decoding method as claimed in claim 13, wherein encoded information of a prediction residual image obtained by performing a motion compensation prediction for an encoding distortion signal generated by encoding a source image in accordance with a predetermined encoding rule is decoded as compressed image information.

19. The image decoding method as claimed in claim 16, wherein when a prediction image to be added to a reconstructed prediction residual image is obtained, motion information detected in a decoding process of encoded information of a source image is used to perform a motion compensation.

20. The image decoding method as claimed in claim 19, wherein motion information detected in a decoding process of encoded information of a source image is set as an initial value and information representing motions at positions adjacent to a position where a motion regarding the motion information occurs is decoded to perform a motion compensation.

21. An image decoder for receiving compressed image information and reconstructing image information by decompressing the compressed image information per predetermined partial domain, comprising:
    a first part decoding compressed image information regarding a predetermined partial domain in accordance with a predetermined decoding rule and obtaining information to identify a waveform vector, an inner product value of the waveform vector and a partial signal waveform, and a position in an image of the partial signal waveform; and
    a second part reconstructing image information based upon the waveform vector identified by the information to identify the waveform vector from a predetermined group of waveform vectors, the inner product value, and the position in the image of the partial signal waveform,
    wherein the first part decodes the position in the image of the partial signal waveform included in the compressed image information as information per predetermined partial image domain when the compressed image information is decoded.

22. The image decoder as claimed in claim 21, wherein the predetermined partial domain is divided into unit blocks to identify a position and is stratified in a block domain formed of one unit block or a plurality of unit blocks based upon an inclusive relation, and the first part decodes position information that is encoded based upon a sequence of bits indicating whether or not each block domain of an individual layer includes a position of a partial signal waveform to obtain an inner product value of the partial signal waveform and any waveform pattern of a group of waveform patterns at the position in the image of the partial signal waveform.

23. The image decoder as claimed in claim 21, wherein the first part decodes encoded information of a source image as compressed image information.

24. The image decoder as claimed in claim 21, wherein the first part decodes encoded information of a prediction residual image obtained by performing a motion compensation prediction for a source image as compressed image information.

25. The image decoder as claimed in claim 21, wherein the first part decodes encoding information of an encoding distortion signal generated by encoding a source image in accordance with a predetermined encoding rule as compressed image information.

26. The image decoder as claimed in claim 21, wherein the first part decodes encoding information of a prediction residual image obtained by performing a motion compensation prediction for an encoding distortion signal generated by encoding a source image in accordance with a predetermined encoding rule as compressed image information.

27. The image decoder as claimed in claim 24, wherein the second part contains a motion prediction part performing a motion compensation by using motion information detected in a decoding process of encoded information of a source image when a prediction image to be added to a reconstructed prediction residual image is obtained.

28. The image decoder as claimed in claim 27, wherein the motion prediction part uses motion information detected in a decoding process of encoded information of a source image as an initial value and performs a motion compensation by decoding information representing motions at positions adjacent to a position where a motion regarding the motion information occurs.

29. An image decoding method, comprising:
    a first image decoding step receiving a first compressed image and reconstructing first image information by decompressing the first compressed image information per predetermined partial domain;
    a second image decoding step receiving a second compressed image and reconstructing second image information by decompressing the second compressed image information per predetermined partial signal waveform; and
    an image synthesizing step obtaining output image information by synthesizing the first image information and the second image information,
    wherein in the second image decoding step, by decoding the second compressed image information in accordance with a predetermined decoding rule, information to identify a waveform vector, an inner product value of the waveform vector and a partial signal waveform, and a position in an image of the partial signal waveform are obtained, and a group of waveform vectors to be used is selected among a plurality of predetermined groups of waveform vectors based upon a code parameter included in the first compressed image information provided to the first image decoding step and the position in the image of the partial signal waveform, and wherein the second image information is generated based upon the waveform vector identified by the information to identify the waveform vector in the selected group of waveform vectors, the inner product value and the position in the image of the partial signal waveform.

30. The image decoding method as claimed in claim 29, wherein when the second compressed image information is decoded at the second image decoding step, the position in the image of the partial signal waveform included in the second compressed image information is decoded as information per predetermined partial image domain.

31. The image decoding method as claimed in claim 30, wherein the predetermined partial domain is divided into unit blocks to identify a position and is stratified in a block domain formed of one unit block or a plurality of unit blocks based upon an inclusive relation, and position information that is encoded based upon a sequence of bits indicating whether or not each block domain of an individual layer includes a position of a partial signal waveform to obtain an inner product value of the partial signal waveform and any waveform pattern in a group of waveform patterns is decoded at the position in the image of the partial signal waveform.

32. An image decoder, comprising:
a first image decoding part receiving a first compressed image and reconstructing first image information by decompressing the first compressed image information per predetermined partial domain;
a second image decoding part receiving a second compressed image and reconstructing second image information by decompressing the second compressed image information per predetermined partial signal waveform; and
an image synthesizing part obtaining output image information by synthesizing the first image information and the second image information,
wherein the second image decoding part comprises a plurality of predetermined groups of waveform vectors; a first part decoding the second compressed image information in accordance with a predetermined decoding rule and obtaining information to identify a waveform vector, an inner product value of a partial signal waveform and the waveform vector, and a position in an image of the partial signal waveform; a second part selecting a group of waveform vectors to be used among a plurality of predetermined groups of waveform vectors based upon a code parameter included in the first compressed image information provided to the first image decoding part and the position in the image of the partial signal waveform; and a third part generating the second image information based upon the waveform vector identified by the information to identify the waveform vector from the selected group of waveform vectors, the inner product value, and the position in the image of the partial signal waveform.

33. The image decoder as claimed in claim 32, wherein when the second image decoding part decodes the second compressed image information, the second image decoding part decodes the position in the image of the partial signal waveform included in the second compressed image information as information per predetermined partial image domain.

34. The image decoder as claimed in claim 33, wherein the predetermined partial domain is divided into unit blocks to identify a position and is stratified in a block domain formed of one unit block or a plurality of unit blocks based upon an inclusive relation, and the second image decoding part decodes position information that is encoded based upon a sequence of bits indicating whether or not each block domain of an individual layer includes a position of a partial signal waveform to obtain an inner product value of the partial signal waveform and any waveform pattern in a group of waveform patterns at the position in the image of the partial signal waveform.

35. The image decoder as claimed in claim 32, wherein the first compressed image information provided to the first image decoding part is set as encoded information of a source image and the second compressed image information provided to the second image decoding part is set as encoded information of an encoding distortion signal generated by encoding the source image, and wherein the image synthesizing part obtains an output image by synthesizing the first image information regarding the source image obtained by the first image decoding part and the second image information regarding the encoding distortion signal obtained by the second image decoding part.

36. The image decoder as claimed in claim 35, wherein the second compressed image information provided to the second image decoding part is set as encoded information of a prediction residual image obtained by performing a motion prediction compensation for the encoding distortion signal generated by encoding the source image.

37. The image decoder as claimed in claim 36, wherein when a prediction image to be added to a reconstructed prediction residual image is obtained, the second image decoding part uses motion information detected in a decoding process of encoded information of a source image at the first image decoding part to perform a motion compensation.

38. The image decoder as claimed in claim 37, wherein the motion information detected in the decoding process of encoded information of a source image by the first image decoding part is used as an initial value and information representing motions at positions adjacent to a position where a motion regarding the motion information occurs is decoded to perform a motion compensation.

39. An image processing system, comprising:
an image encoder having a pattern matching part searching for a waveform vector in a predetermined group of waveform vectors based upon inner products of the waveform vectors and a partial signal waveform of an image signal and a waveform pattern encoding part encoding information to identify the waveform vector searched for, an inner product value of the partial signal waveform and the waveform vector searched for, and a position in an image of the partial signal waveform in accordance with a predetermined encoding rule, wherein the waveform pattern encoding part encodes the position in the image of the partial signal waveform through replacement with position information in a predetermined partial domain of the image signal, and wherein in a process in which operations on the pattern matching part and the waveform pattern encoding part are iterated until a predetermined condition is satisfied, whenever encoding information is obtained at the waveform pattern encoding part, a reconstructed waveform of a partial signal waveform obtained from the encoding information is subtracted from the image signal so as to produce an image signal to be provided to the pattern matching part and compressed image information for the image signal is generated according to the encoding information obtained by the waveform pattern encoding part until the predetermined condition is satisfied; and
an image decoder having a first part receiving compressed image information and reconstructing image information by decompressing the compressed image information per predetermined partial domain, decoding compressed image information in a predetermined partial domain in accordance with a predetermined decoding rule and obtaining information to identify a waveform vector, an inner product value of the waveform vector and a partial signal waveform and a position in an image of the partial signal waveform, and a second part reconstructing image information based upon a waveform vector identified by the information to identify a waveform vector from a predetermined group of waveform vectors, the inner product value, and the position in the image of the partial signal waveform, wherein the first part decodes the position in the image of the partial signal waveform included in the compressed image information as information per predetermined partial image domain when the compressed image information is decoded.

* * * * *